(12) United States Patent
Saund

(10) Patent No.: US 7,725,493 B2
(45) Date of Patent: May 25, 2010

(54) OPTIMIZATION METHOD AND PROCESS USING TREE SEARCHING OPERATION AND NON-OVERLAPPING SUPPORT CONSTRAINT REQUIREMENTS

(75) Inventor: Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 530 days.

(21) Appl. No.: 11/726,798

(22) Filed: Mar. 23, 2007

(65) Prior Publication Data
US 2008/0235211 A1    Sep. 25, 2008

(51) Int. Cl.
G06F 7/00 (2006.01)
(52) U.S. Cl. .................. 707/797; 707/713
(58) Field of Classification Search .......... 707/5, 707/3
See application file for complete search history.

(56) References Cited

U.S. PATENT DOCUMENTS

| | | | |
|---|---|---|---|
| 5,522,022 A | 5/1996 | Rao et al. | |
| 5,553,224 A | 9/1996 | Saund et al. | |
| 6,380,954 B1 * | 4/2002 | Gunther | 715/764 |
| 6,459,442 B1 | 10/2002 | Edwards et al. | |
| 6,651,048 B1 * | 11/2003 | Agrawal et al. | 707/2 |
| 6,903,751 B2 | 6/2005 | Saund et al. | |
| 7,036,077 B2 | 4/2006 | Saund et al. | |
| 7,136,082 B2 | 11/2006 | Saund et al. | |
| 7,139,004 B2 | 11/2006 | Saund et al. | |
| 7,581,052 B1 * | 8/2009 | Solomita | 710/267 |
| 2004/0090439 A1 | 5/2004 | Dillner | |
| 2006/0045337 A1 | 3/2006 | Shilman et al. | |
| 2006/0062475 A1 | 3/2006 | Li et al. | |

FOREIGN PATENT DOCUMENTS

| EP | 1351123 A | 10/2003 |
|---|---|---|
| EP | 1367528 A | 12/2003 |
| WO | WO-01/75568 A | 10/2001 |

OTHER PUBLICATIONS

European Search Report, Appl. No. EP08151894.6-2218, mailed Jun. 5, 2008.

(Continued)

*Primary Examiner*—Etienne P LeRoux
*Assistant Examiner*—Cindy Nguyen
(74) *Attorney, Agent, or Firm*—Fay Sharpe LLP

(57) ABSTRACT

A method and process provides a selection process designed to select optimized results from a plurality of possible results represented in a search tree. A tree search is employed, wherein bounds are used to prune at least one node or branch of the search tree. A non-overlapping support constraint in conjunction with the tree search is invoked to further prune the search tree. An optimized search tree is stored into a memory, following the invoking of the non-support constraint, and the optimized search tree is employed in additional processing operations.

16 Claims, 28 Drawing Sheets

OTHER PUBLICATIONS

Ming Ye et al., "Grouping Test Lines in Freeform Handwritten Notes", Document Analysis and Recognition, 2005; Proceedings 8th Int'l Conference, Seoul, KR, IEEE, Aug. 31, 2005, pp. 367-373.

Shilman, "Discerning Structure from Freeform Sketches", University of California, Berkely, Ph.D. Dissertation, 2003, pp. 130-158.

Wang et al., "Parsing Ink Annotations on Heterogeneous Documents," Proceedings Eurographics Workshop on Sketch-Based Interfaces and Modeling, Sep. 3, 2006, Sep. 4, 2006, pp. 1-8.

European Search Report, Appl. No. EP08151933, mailed Jun. 18, 2008.

Saund, Eric et al., "Stylus Input and Editing Without Prior Selection of Mode", Proc. UIST '03 (ACM Symposium on User Interface Software and Technology), 5 pgs. and Abstract.

Saund, Eric et al., "Perceptually-Supported Image Editing of Text and Graphics," Proc. UIST '03 (ACM Symposium on User Interface Software and Technology), 10 pgs. and Abstract.

Saund, Eric, "Finding Perceptually Closed Paths in Sketches and Drawings," *IEEE Transactions on Pattern Analysis and Machine Intelligence*, vol. 25, No. 4, Apr. 2003, pp. 475-491.

Alvarado, Christine J., "Multi-Domain Sketch Understanding," Massachusetts Institute of Technology 2004, pp. 1-128.

* cited by examiner

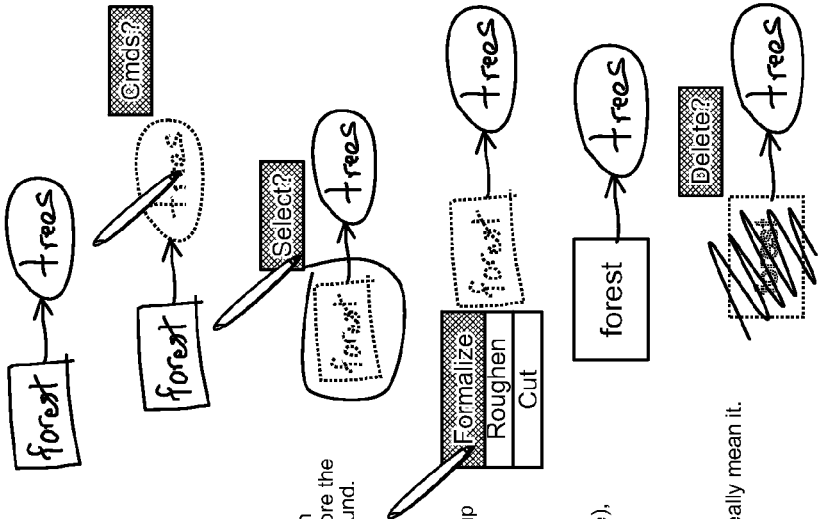

ConceptSketch Instructions

ConceptSketch is an Electronic Whiteboard program for creating concept maps.

130a — 1. Draw Objects and Links of your concept map as you would on paper or whiteboard. Add text and graphics as you please, in any order.

130b — 2. To select an object, tap on it. By tapping repeatedly, you can select Objects, Links, or their graphical and textual parts.

130c — 3. You can also select objects by encircling them. Tap the "Select" button to select what's inside. To leave your encircling as digital ink, just ignore the "Select?" button and keep on writing or drawing, or, tap in the background.

130d — 4. When you have selected something, tap the "Cmds?" button to bring up a menu of things to do. Or, tap in the background to un-select.

130e — 5. Use the pop-up command menu to Formalize, Roughen (de-Formalize), Change Colors, Copy, or Cut what you have selected.

130f — 6. To delete something, scratch it out. Tap the "Delete?" button if you really mean it. Tap in the background if you don't.

FORMAL INTERFACE
BETWEEN A GUI MODULE AND A RECOGNIZER MODULE

252 — public void run();

254 — public int[] selectPath(Path path);

256 — public int[] deleteStrokes(int[] stroke_ids);

258

OUTCOME OF STRUCTURE RECOGNITION {
  public int[] selectTap(Point p, boolean b_last_operation_was_select_objects);
  public int[] scratchOut(PenPath scratchout_path); — 260
  public String formalizeObjects(int[]object_ids); — 262
  public String roughenObjects(int[] object_ids); — 264
}

266 — public void preinterpretStrokesinInputStrokeQueue();

268 — public void performStructureRecognitionOnPreprocessedStrokes();

270 — public PenPath[] affineTransform(int [] stroke_ids, float[] transform_matrix);

FIG. 12

FIG. 18
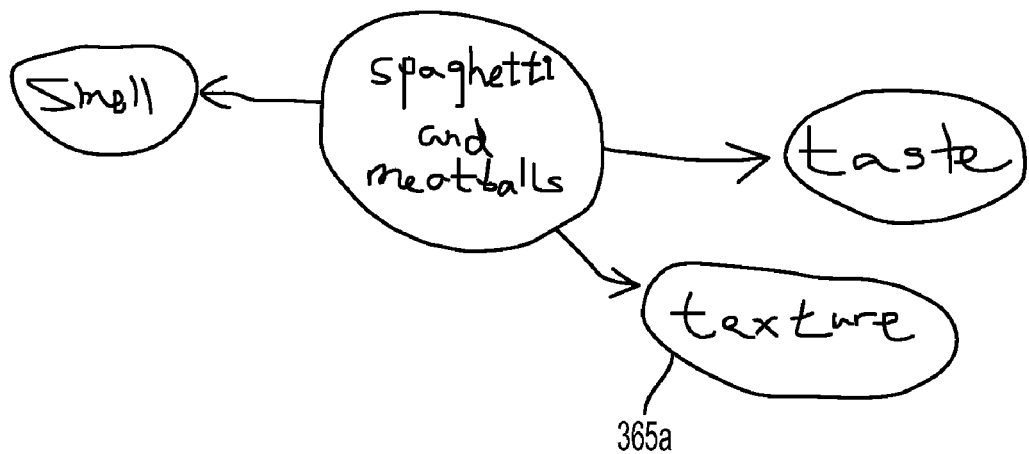
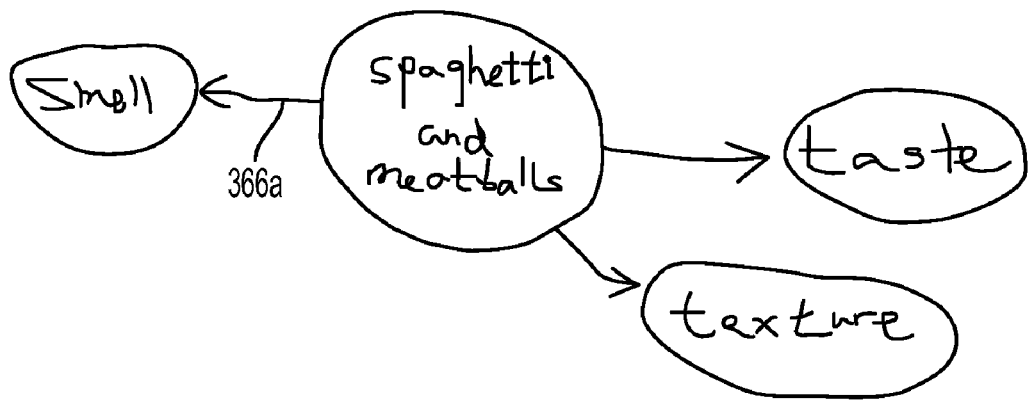
FIG. 19

OPTIMIZATION METHOD AND PROCESS USING TREE SEARCHING OPERATION AND NON-OVERLAPPING SUPPORT CONSTRAINT REQUIREMENTS

CROSS REFERENCE TO RELATED PATENTS AND APPLICATIONS

This application is related to co-pending U.S. patent application Ser. No. 11/726,952, filed on Mar. 23, 2007 by Saund, et al., entitled "METHOD AND APPARATUS FOR CREATING AND EDITING NODE-LINK DIAGRAMS IN PEN COMPUTING SYSTEMS"; and co-pending U.S. patent application Ser. No. 11/726,796, filed on Mar. 23, 2007, by Saund, entitled "METHODS AND PROCESSES FOR RECOGNITION OF ELECTRONIC INK STROKES."

BACKGROUND

The present application is directed to the generation of electronically formed images, and more particularly to node-link type diagrams and more particularly concept maps which may be formed in a manner similar to those formed using a non-electronic whiteboard or pen and paper, but which further includes the ability to be electronically edited.

Pen/stylus interfaces to computers hold the promise of applications that are as intuitive as a paper or whiteboard but with the power and functionality of editing, search, and other processing provided by computer applications. Although vertical surface and horizontal surface hardware has advanced considerably in the form of SMART Boards from SMART Technologies Inc. and the TabletPC Operating Systems from Microsoft Corporation, user interfaces remain awkward and unsophisticated.

The concepts of the present application include, among others, designing and implementing an easy to operate, intuitive user interface for a particular target application, that of creating and editing node-link diagrams, which include the genre of concept maps, mind maps, and others. Examples of concept mapping software include MindJet from Mind Jet Corporation, SMART Ideas from SMART Technologies Inc., and FreeMind an Open Source mind mapping program written in Java, among others.

Current UI designs for node-link diagrams such as concept mapping and mind mapping are adaptations of keyboard/mouse software in which graphics are entered by selecting from menus, and text is entered with a keyboard. To adopt this paradigm to pen/stylus computers the pen is treated primarily as a pointing device, but in some cases limited single-stroke shape recognition is used to enter node objects or to indicate links, and handwriting recognizers such as from Microsoft or other software companies can be brought up for pen entry and editing of text. This approach falls considerably short of what one would expect from an intelligent application that recognizes and assimilates what you are drawing and writing as you draw and write it without your having to perform extraneous user interface commands. The present application presents systems and methods which overcome these and other shortcomings of existing pen based systems and methods.

INCORPORATION BY REFERENCE

U.S. Pat. No. 7,036,077, entitled, "Method For Gestural Interpretation In A System For Selecting And Arranging Visible Material In Document Images", by Saund et al.; U.S. Pat. No. 7,139,004, entitled, "Method And Apparatus To Convert Bitmapped Images For Use In Structured Text/Graphics Editor", by Saund et al.; U.S. Pat. No. 7,136,082, entitled, "Method And Apparatus To Convert Digital Ink Images For Use In A Structured Text/Graphics Editor", by Saund et al.; U.S. Pat. No. 6,903,751, entitled "System And Method For Editing Electronic Images," by Saund et al.; and U.S. Pat. No. 5,553,224, entitled "Method For Dynamically Maintaining Multiple Structural Interpretations In Graphics System", by Saund et al., all of which are hereby incorporated by reference in their entireties.

BRIEF DESCRIPTION

A method and process provides a selection process designed to select optimized results from a plurality of possible results represented in a search tree. A tree search is employed, wherein bounds are used to prune at least one node or branch of the search tree. A non-overlapping support constraint in conjunction with the tree search is invoked to further prune the search tree. An optimized search tree is stored into a memory, following the invoking of the non-support constraint, and the optimized search tree is employed in additional processing operations.

BRIEF DESCRIPTION OF THE DRAWINGS

FIG. 6 provides a summary of the various instructions/operations for the program (e.g., ConceptSketch) of the present application;

FIG. 12 sets forth the various methods of the interface between the GUI and Recognizer modules;

FIG. 18 depicts closed-path object hypotheses obtained for a node-link diagram;

FIG. 19 depicts curvilinear connector hypotheses obtained by the system for a node-link diagram;

DETAILED DESCRIPTION

1. Introduction

Figure 1:
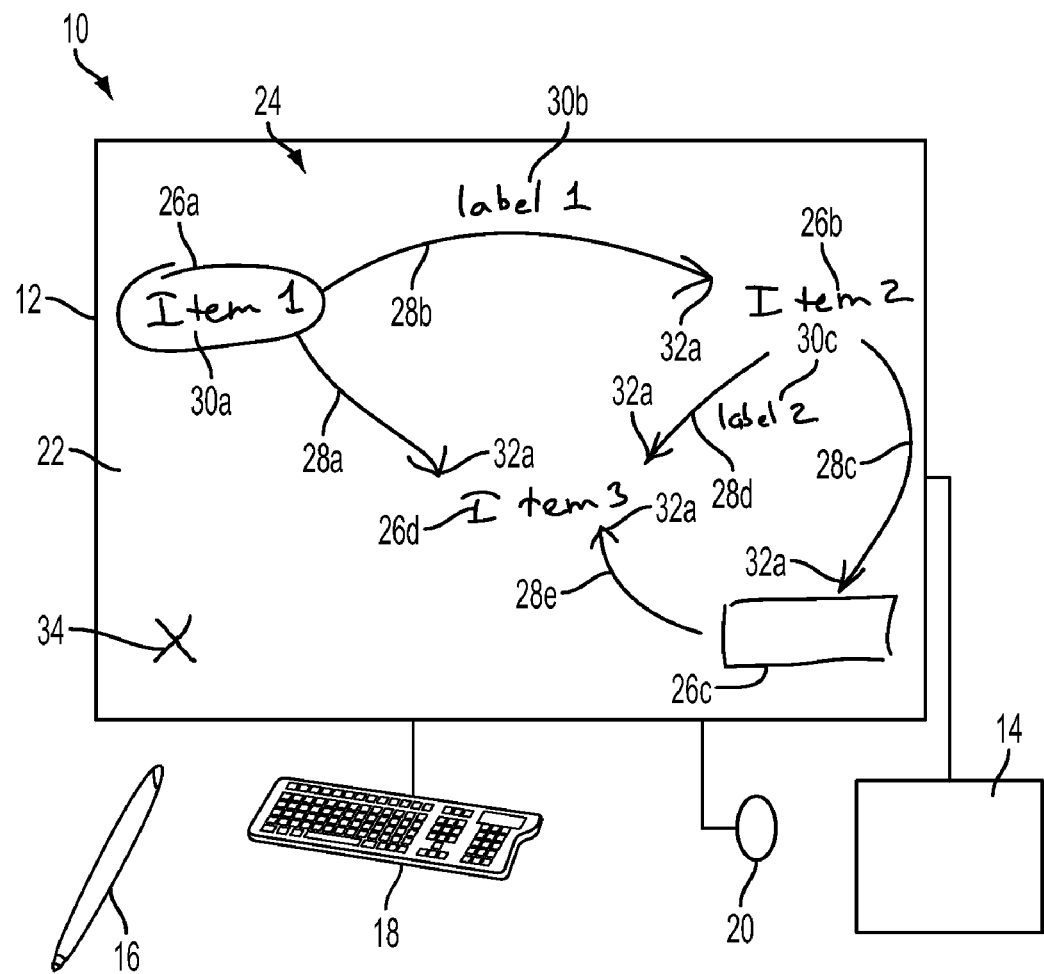
FIG. 1 illustrates the concepts of the present application within a stylus/pen computing environment.

The following describes methods and systems for interactive creation and editing of node-link diagrams with stylus/pen computing systems, at times referred to herein as the ConceptSketch program or process which employs a User Interface (UI). The UI operates as an extension to writing on an electronic whiteboard, graphics tablet, digital paper, or other flat surface or electronic canvas. As the user draws text and graphics, the markings are covertly interpreted as the nodes, links, and textual labels of a node-link diagram, such as a concept map. The recognized structure subsequently enables simple tap selection of meaningful objects, and incremental, user-directed, reversible beautification/formalization operations. The UI requires no learning of arcane gestures, no requirement to set command and/or draw modes, and no need for toolbars or palettes.

This UI design employs a novel architecture which divides the complex below-the-surface work of the UI into Graphical User Interface (GUI) and Recognition modules (also called layers or processes). Digital ink strokes are maintained in parallel between the GUI and Recognition modules, and communication between modules takes place primarily in terms of Stroke IDs and XML strings.

Realization of the UI design also depends on the ability of the Recognition module to interpret hand-drawn text and graphics. It is well known that this is a very difficult problem in the Artificial Intelligence and Computational Vision fields, due to richness and complexity of the diagram domain, imprecision on the part of human users, and ambiguity in the interpretation of constituent digital ink strokes. The present concepts disclose approaches to solve the problem for the node-link diagram interpretation task. This application also describes the ontology of objects, algorithms for building a lattice of hypotheses, and constrained search processes to search the hypotheses space for the optimal, near-optimal, or desired obtainable global interpretation.

As noted above, in a general sense, the present concepts are directed to methods and systems for intelligent node-link diagram creation and editing, where the intelligent portion of the system covers the added functionality obtained by recognition of the structure of the diagrams, either independently or bundled together. Also, while the following generally discusses node-link diagrams, the present concepts provide particular benefits to the creation and editing of concept maps.

Concept maps are special forms of node-link diagrams which are composed of nodes and links used to graphically represent information. In concept mapping nodes are defined as the representation of data that represent a concept, item or question. Nodes can have a wide number of non-exclusive attributes to represent the data, such as labels, colors, or shapes, among others. Links are also used to represent data by depicting relations among concept nodes. Often, they have an additional characteristic in that they relate to data representations by identifying direction, for example, with a termination symbol such as an arrow symbol. Thus, labeled links explain the relationship between the nodes, and arrows or other terminators can describe the direction of the relationship, allowing the user to read the concept map. Directional links are, however, optional in concept maps and other node-link diagrams. Further, the links may have termination symbols on either end, or may not have any termination symbols. Also, links and nodes can be either labeled or unlabeled. At times, simply the existence of a directed or undirected link is sufficient to express a relationship, while in other situations, the label will provide more details of a relationship.

2. Overview

Turning attention to FIG. 1, illustrated is an environment or system 10 within which the concepts of the present methods or systems may be implemented. An electronic display 12 is in operative communication with a computing device 14. The display 12 and computing device 14 are configured to operate with an electronic stylus or pen 16, or additionally/alternatively a keyboard 18 or mouse 20. The computing device 14 includes memory and processing capabilities sufficient to store and operate the ConceptSketch program when appropriate inputs are received by the computing device 14. While various ones of the components described above are shown wired to each other, it is to be appreciated the system may act in a wired or wireless environment. While depicted as separate components, it is to also be appreciated various ones of the above-described components may be integrated into a single unit, such as a tablet computer, personal digital assistant, cell phone, or other electronic device with computational capabilities. Also, the electronic display 12 may be associated with or integrated into any one of these devices, as well as an electronic whiteboard system, which is a commonly used example in the following discussion. The foregoing described components and systems are not intended to be limiting to the present discussion, but rather are examples of environments in which the concepts of the present application may be employed.

With continuing attention to FIG. 1, the electronic display 12 and computing device 14 are configured to form a writing area such as a canvas 22 on which a user operates the stylus or pen 16 to create a node-link diagram 24 in accordance with the concepts of the present application. The canvas is intended to represent a region of the electronic display, which permits drawing or writing directly onto the surface of the display by generation of electronic ink by the stylus or pen 16.

In still further alternative embodiments, a device (e.g., a graphics tablet) that is written upon in order to enter the ink strokes, may be separate and apart from the display on which a user or others view the diagram.

Hand-drawn node link diagram 24 contains four nodes 26a-26d, and five links 28a-28e, where closed graphic shapes (e.g., 26a and 26c) represent nodes; curved linear arcs (e.g., 28a-28e) represent links linking two nodes; text alone (e.g., 26d) may also be used to represent nodes; and text may be included within nodes (e.g., 30a). Text (30b-30c) can be labels of links, and arrows or other shapes 32a are used to identify termination of links in the node-link diagram as will be expanded upon below. It is also to be understood that not every stroke on a canvas must be part of the node-link diagram. For instance, ink stroke 34 may be interpreted by the present system and method as an "other" type of stroke or extraneous material.

Figure 2:
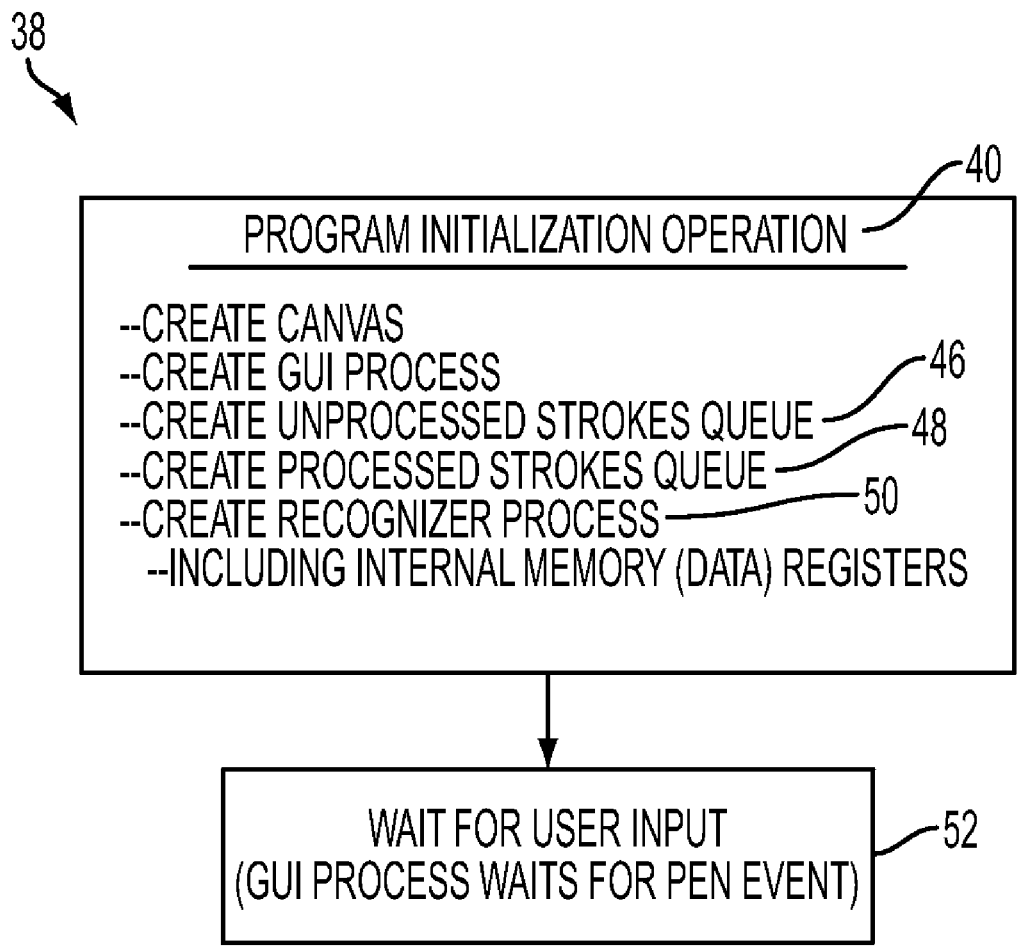
FIG. 2 provides a high-level view of the processes used to initiate the concepts of the present application.

Turning to FIG. 2, illustrated is a high-level diagram 38 that describes an embodiment of the initialization operations 40 used to arrange the environment 10 for operation of the present system and method. These operations include a canvas creation initialization process 42; a Graphical User Interface (GUI) initialization process 44; an unprocessed strokes queue initialization process 46, a processed (or interpretation) strokes queue initialization process 50, as well as a recognition initialization process 48. Once the above initializations have been completed a wait state for user input (such as an electronic pen stroke) is entered 52. Thus, the system can operate in realtime as input is provided. Alternatively, the system can be designed to read ink strokes from a file of stored ink strokes, and thus realtime input operation is not a mandatory feature of the system.

Various ones of initialized processes 42-50 are de-synchronized from each other, such that they may be run as separate asynchronous threads within an operating system. This de-synchronization provides flexibility to the ConceptSketch program, and the ability for realtime response to writing while executing recognition processes as a background job.

Figure 3:
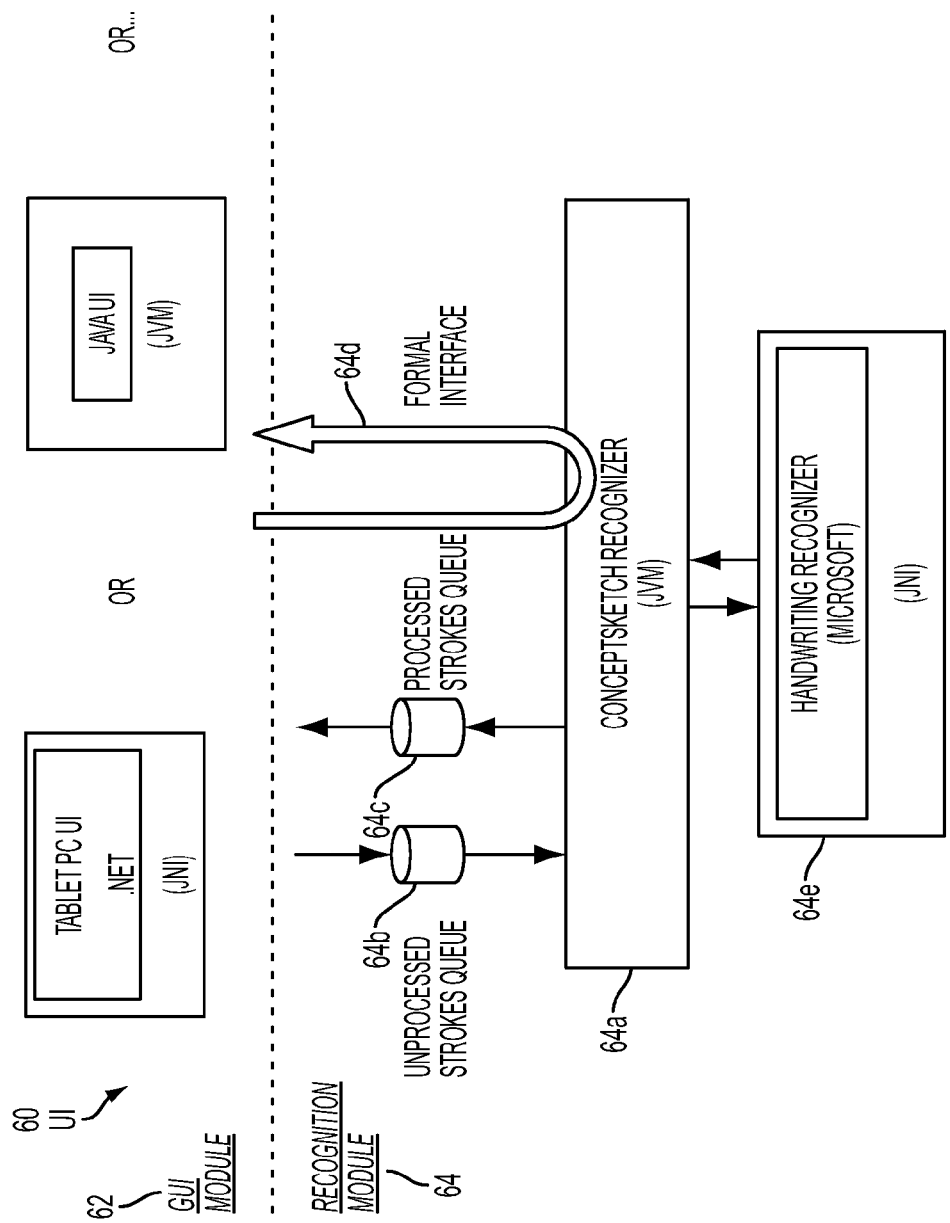
FIG. 3 is an architectural relationship between the graphical user interface module and the recognition module of the present application.

FIG. 3 illustrates a system architecture overview of the User Interface (UI) 60, showing the relationship between GUI module 62, and Recognition module 64. The GUI module 62 is designed to handle input and display of digital ink strokes on the canvas, and the majority of the command interaction logic such as detecting encircling strokes and presenting and handling pop-up buttons. The GUI module 62 may be implemented in a variety of programming language and run-time environments, which may be different from the environments of the Recognition module 64, which includes a ConceptSketch recognizer (which may run in a, JVM—Java Virtual Machine) 64a, unprocessed strokes queue 64b, a processed (interpretation) strokes queue 64c, a formal interface 64d and access to a handwriting recognizer 64e.

As will be discussed in greater detail below, the Recognition module 64 is designed to interpret the user's input markings in terms of words, lines, columns of text, graphic objects and the model of node-link diagrams. The unprocessed strokes queue 64b is designed to receive electronic ink stroke information from GUI module 62, and the processed strokes queue 64c will provide processed stroke information from the Recognition module 64 to the GUI module 62. Formal interface 64d provides a path for interaction between the two modules. The handwriting recognizer, in one embodiment may be handwriting software from Microsoft Corporation, such as may be used in its TabletPC operating systems.

Figure 4:
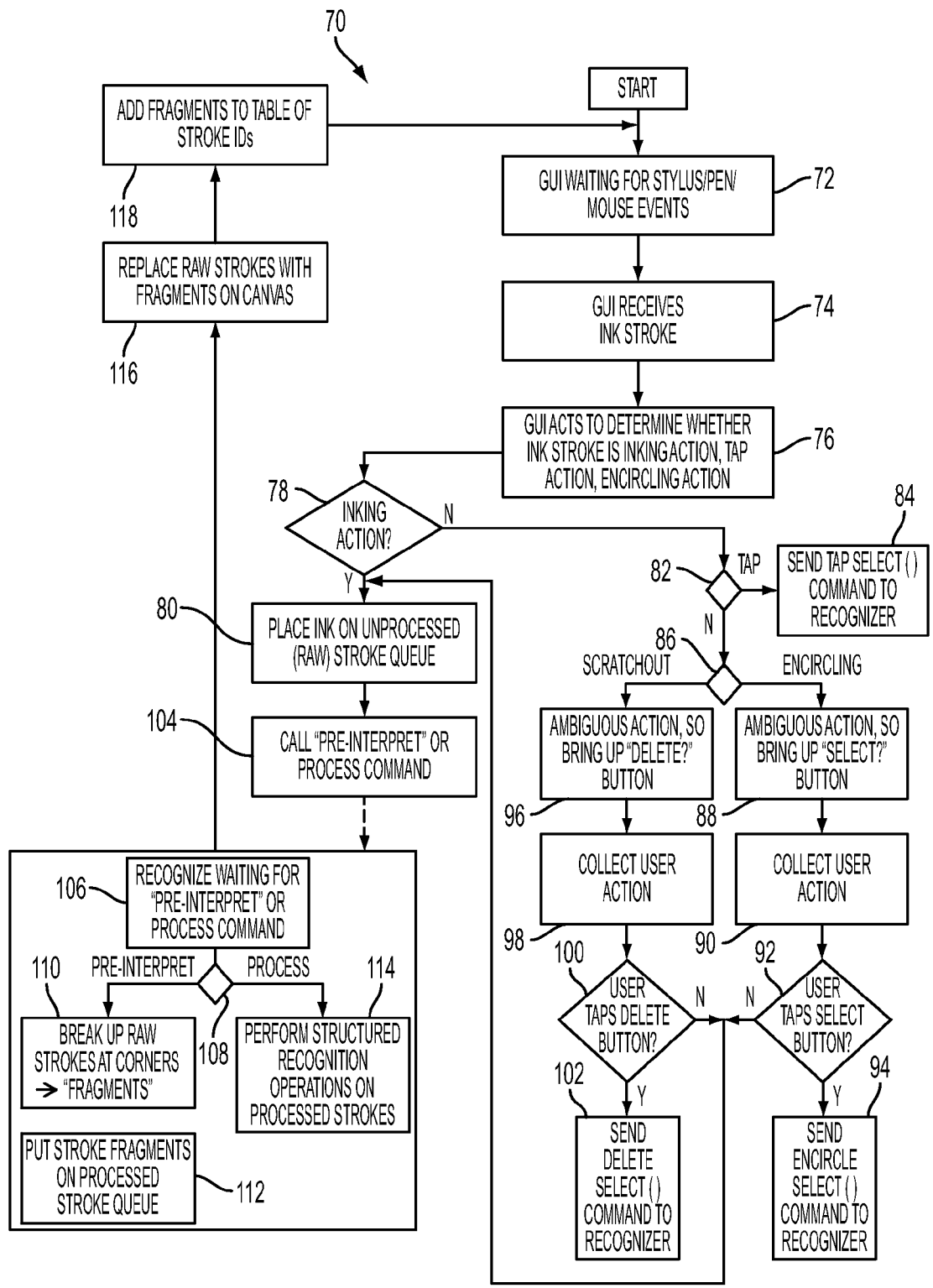
FIG. 4 sets forth a high-level flow diagram for the operational aspects of the present application.

Turning now to FIG. 4, set forth is a high-level flow chart 70 illustrating implementation of the present concepts. At step 72, the GUI module is waiting for an event, such as an input (e.g., a stroke) from the stylus or pen. When the user puts the pen to the surface of the canvas, the GUI module receives an ink stroke 74. Upon receipt of the ink stroke, the GUI module determines whether the ink stroke is: (i) an inking action, (iii) a tap action, (iii) an encircling action, or (iv) a scratch-out action 76. The inking action is interpreted as an act of writing or drawing on the canvas. A tap action is the movement of the stylus or pen onto a spot of the canvas and is intended to select or deselect the item which is tapped. Alternatively, when an item is selected, a tap in the background of the canvas acts to deselect that item. The encircling action is an ink stroke that encircles other existing ink strokes or other items and may be an inking action or selection gesture. The scratch-out action is an act of writing or drawing in a zig-zag, back-and-forth, X-ing out, or other "delete" type action over existing ink strokes or other items. As part of the process, the encircling and scratch-out actions will be determined to be either inking actions or selection gestures.

In step 78, an initial decision is made as to whether the stroke is definitely an inking action (i.e., intended to be writing or drawing). Step 78 determines that a stroke is definitely an inking action if one of the following is true: (i) the stroke's length is less than a predetermined size and there are no objects on the canvas nearer than a predetermined distance to the stroke and the stroke begins within a predetermined time after the end (pen-lift) of the previous stroke; (ii) the stroke does not form a closed path shape and does not form a zig-zag (scratchout) shape; (iii) the stroke forms a closed path shape that does not encircle any other material on the canvas; or (iv) the stroke forms a zig-zag (scratchout) shape but no objects on the canvas are within a predetermined proximity to the stroke.

If the process determines the stroke is definitely an inking action, the processing proceeds to step 80 where the stroke is placed on the unprocessed raw stroke queue (e.g., 64b of FIG. 3). If the stroke is ambiguously an inking action or a tap select, encircling select, or scratch-out command gesture, the process moves to step 82 to determine whether the stroke is a tap action, or else one of an encircling action, scratch-out action, or inking action. Step 82 determines the stroke is a tap action if the stroke's length is less than a predetermined threshold, the stroke begins more than a predetermined time after the end (pen-lifting) of the previous stroke, and if at least one object on the canvas is within a predetermined distance of the stroke's location. If in step 82, the action is determined to be a tap action, the process moves to step 84, which sends a command or signal to the Recognizer module to perform the operation associated with the corresponding tap select command (not shown in this figure). On the other hand, at step 82, if it is determined the action is not a tap action, processing proceeds to step 86. Step 86 determines whether the stroke is possibly an encircling select gesture or possibly a scratch-out delete gesture, based on the stroke's shape.

If the stroke is possibly an encircling select gesture, then a "Select?" button is displayed to the user 88. This indicates the encircling action is ambiguous to the system as it cannot determine if the encircling action is intended to be an inking action (i.e., a writing or drawing), or a selection gesture. Therefore, in step 90, the system is positioned to collect user actions which will clarify the situation. More particularly, in step 92, if the user places the stylus or pen to the "Select?" button associated with the encircled information, the system moves to step 94, where an encircle select command is provided to the Recognition module (not shown in this figure). This indicates that the encircling action is a selection gesture. Then the Recognition module will determine what is selected. The Recognition module, for example, could select what was encircled or covered by a scratch-out, or it could interpret the intent of the gestures in terms of recognized strokes (or other items) that were or were not literally covered. On the other hand, if at step 94, the user does not perform a tap select operation, but rather places the pen down in the background of the canvas, the system interprets this as indicating the encircling information is intended to be a word or drawing, and the stroke is added to the canvas as digital ink at step 80.

If the stroke is possibly a scratchout delete gesture 86, then at a "Delete?" button is displayed for the user 96. This indicates the stroke action is ambiguous to the system as it cannot determine if the stroke action is intended to be an inking action (i.e., a writing or drawing), or a deletion gesture. Therefore, in step 98, the system is positioned to collect user actions which will clarify the situation. More particularly, in step 100, if the user places the stylus or pen to the "Delete?" button associated with the objects in close proximity to the stroke, the system moves to step 102, where a scratchout select command is provided to the Recognition module (not shown in this figure). This indicates the inking action is a deletion gesture and the items covered by the gesture are deleted from the Recognition module and the UI canvas. On the other hand, if at step 100, the user does not perform a tap select operation on the "Delete?" button, but rather places the pen down in the background of the canvas, the system interprets this as indicating the scratchout stroke is intended to be a word or drawing, and the stroke is added to the canvas as digital ink at step 80.

When an action is determined to be an ink stroke at step 80, the process places the stroke—identified as inking actions—on the unprocessed (raw) strokes queue. In step 104 a pre-interpret or process command is sent to the recognizer module to perform "pre-interpret" and/or "process" operations on the strokes in the unprocessed strokes queue. The operations performed in steps 72 through 104, may be considered to take place in the GUI module (e.g., 62 of FIG. 3). At this point, the Recognition module will undertake the pre-interpret and/or process commands. However, as the GUI module and Recognition module are temporally de-synchronized in their operations, additional strokes may be placed on the canvas, during this time, and the GUI module will continue to operate independently.

With regard to the Recognition module, as shown in step 106, the Recognition module is waiting for the "pre-interpret" or "process" commands to be issued by the GUI module. Once received, operation of the Recognition module moves to a decision block 108, wherein the process moves to step 110 when it is determined the command is a pre-interpret command. At that point, the raw strokes from the unprocessed strokes queue are broken up at the corners into fragments (This operation is for more complex strokes. For simple strokes, which have no corners, this operation is not necessary).

Thereafter, the stroke fragments and/or simple strokes are provided with identification information (IDs) and are then placed on the processed strokes queue 112. Once this information has been placed on the processed strokes queue, the GUI layer 62 moves to step 116 and replaces the raw strokes with the stroke fragments from the processed strokes queue. Then in step 118, the GUI adds all the stroke fragments to a table or other memory device along with the stroke IDs. Hence, once put in the table or other memory device, the stroke fragments replace the raw strokes on the canvas (such replacement will be imperceptible to a user).

It is to be understood that in an initial passing of the stroke information between the GUI module 62 and Recognition module 64, both the information of the points (i.e., x-y positions and time) making up the stroke fragments, along with the IDs, are passed to the GUI module. In this way, the Recognizer module and the GUI module has the same stored information regarding the strokes.

If the command sent from the GUI module is a "process" command, rather than a "pre-interpret" command, then at step 106, the process moves to step 114 where structured recognition operations are performed on the processed fragmented strokes. Thereafter, these structured processed fragments may, in one embodiment, be maintained in the Recognition module until strokes (e.g., in the form of objects) are selected for some sort of command operation (e.g., formalize, move, etc.).

Flowchart 70 outlines the process of determining whether a stroke is an inking action, a tap action, an encircling action or a scratch-out action, and the operations taken following such a determination. Employing the above process permits a user to create node-link diagrams as intuitively as using a paper or whiteboard, but with the power and functionality of computer applications.

Figure 5:
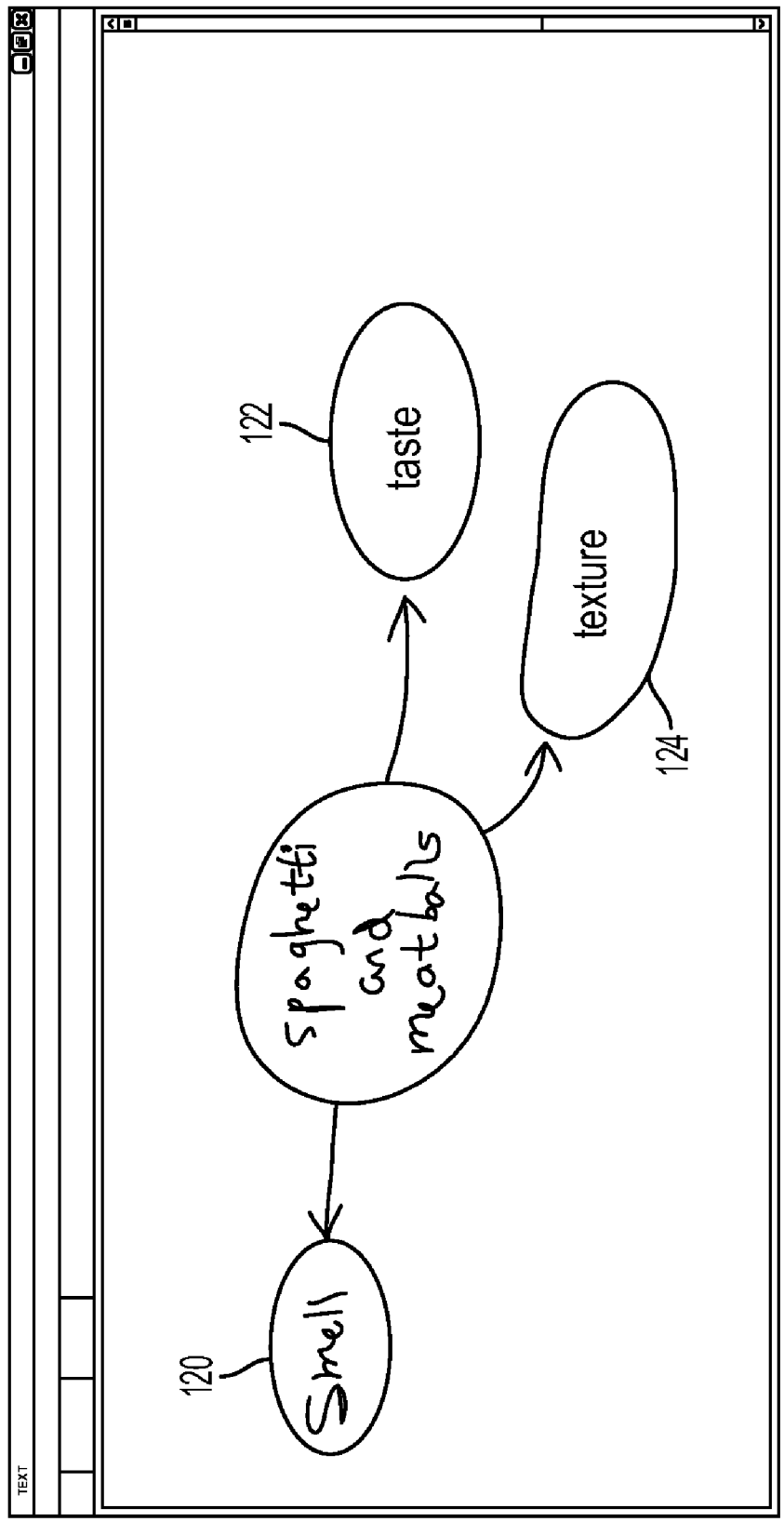
FIG. 5 is a screen snapshot of the node-link diagram program of the present application.

FIG. 5 depicts a screen shot of a node-link diagram 120 generated using the concepts of the present application, where the user has selected and formalized certain parts, i.e., "taste" within the oblong 122 and the word "texture" 124 of the hand-drawn concept map (i.e., the node link diagram). The node-link diagram has been automatically recognized by the system as having four graph nodes and three graph links.

It is to be understood the pre-interpret and/or process operations can also be undertaken by having the Recognition module poll the unprocessed and processed queues to determine if there are any strokes on the queues for which the above operations are to be performed. The system can also be designed to undertake multiple pre-interpret operations and then process those pre-interpreted strokes as a group, or the system can be arranged so the pre-interpret operation is directly followed by a process operation of the same stroke.

3. UI Design

The system described herein has the look and feel of a normal whiteboard. The program can be used as a simple walk-up and draw/write device with no formal training. Then, with just a minimal amount of instruction the user gains access to the power of a behind-the-scenes recognition engine that enables them to easily manipulate anything they may have drawn that resembles a node-link diagram in terms of its meaningful parts and relations. Users can select node objects, link objects, or their constituent graphical figures and textural labels by a standard Tap gesture. Or, users can select by the standard encircling gesture. Once selected, users can manipulate these objects, by changing color, moving and resizing them, and most notably by beautifying or formalizing them. Users can also delete by the standard scratch-out gesture. FIG. 6 presents an example instruction sheet 130 illustrating the small number of instructions 130*a*-130*f* which a user needs to know to operate the UI for the system of the present application.

One of the most perplexing issues in user interface design for pen computing is the mode problem. This is the fact that a single implement—the pen—must be used for multiple functions, namely, entering markings, selecting markings, and specifying commands to be performed on selected markings. The state of the art in pen computing user interfaces is to require the user to switch and consciously monitor which of several modes the system is in. Having to keep track of modes leads to errors, confusion, and frustration for users.

A solution to the mode problem presented here uses, in one embodiment, an Inferred Mode protocol and a tap cycle selection technique for mixed digital ink input and selection in pen/stylus systems. Under the Inferred Mode protocol, the user is free to perform marking or selection gestures without prior specification of mode. The system attempts to infer user intent from context. If the intent is ambiguous, then a mediator button appears which the user may either tap or ignore.

Under the Inferred Mode protocol, pen input is registered as digital ink as it is drawn on the canvas. Certain pen input, however, can also be interpreted as being intended by the user to select some subset of digital ink markings. For example, tapping on an object, encircling it, or scratching it out are all forms of input that are natural for initiating selection and deletion operations. When the user's intent is ambiguous, then a choice is provided to the user in the form of the pop-up button or icon.

Drawing a closed empty circle is clearly a drawing action, but drawing an encircling around some existing digital ink is ambiguous. The user could be attempting to select the enclosed material, or they could simply be drawing a circle around it. In this case a pop-up button is shown saying "Select?" If the user taps the pop-up button then the material is displayed in highlight mode to show it is selected, and locally icons for resizing and performing other operations are overlain on the canvas. Or, the user is free to ignore the pop-up button and keep drawing, in which case the encircling will be registered as digital ink.

When the user performs a scratch-out entry over existing markings, it is ambiguous as to whether they intend to delete the underlying markings versus enter digital ink showing cross-out. In this case, the system infers what underlying ink the user is likely to be indicating to be deleted, highlights it, and brings up a pop-up button saying, "Delete?" If the user taps on the pop-up button then the material is deleted. If they tap in the background or keep on drawing, the scratch-out marking is registered as digital ink. Finally, a well-established method of selecting image objects is to tap on them.

Figure 7:
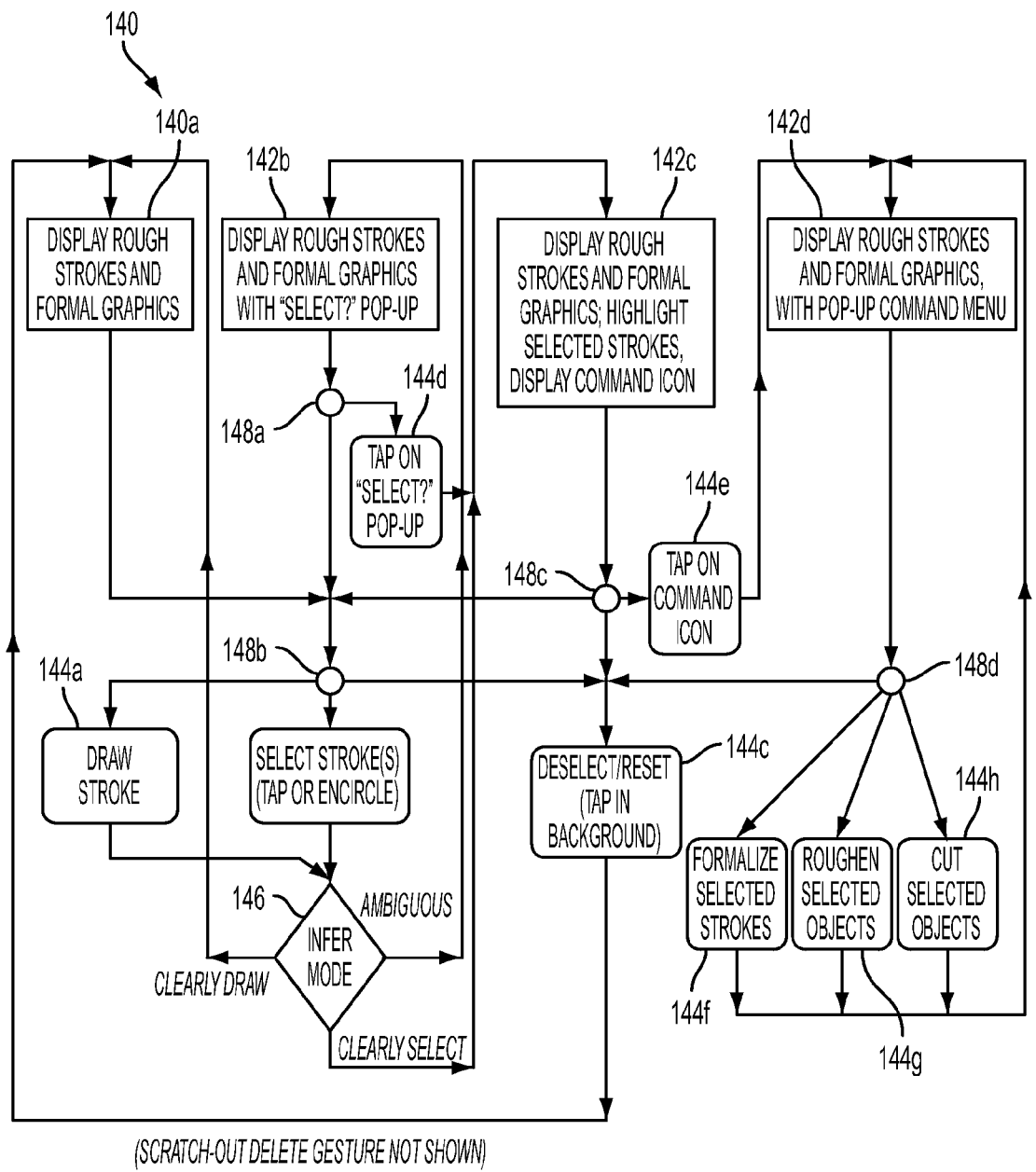
FIG. 7 is a flow diagram for the user action protocol for the ConceptSketch program of the present application based on the inferred-mode protocol.

An example of User Interaction with the UI is represented by Interaction Flow Diagram 140 of FIG. 7. (This version of the diagram omits the scratch-out delete gesture for easy understanding.) Squared boxes represent computer display of information to the user (i.e., square boxes are computer actions associated with information displayed to the user 142a-142d). There are four primary ways the display can appear: the content of the canvas only (including handwritten strokes and formal graphic objects) 142a; the content of the canvas with the "Select?" button displayed 142b; the content of the canvas with some items highlighted as selected, along with the Command Icon 142c; the contents of the canvas with some items selected, along with a pop-up command menu 142d. Rounded boxes represent user actions, including: drawing strokes; drawing an encircling gesture; tapping on strokes or formal graphic objects to select objects or cycle through selections; tapping in the background to deselect; tapping on the pop-up "Select?" button; tapping on the pop-up command icon; and choosing an item in the pop-up command menu, 144a-144h. Decision diamond 146 represents the processes' determination whether the ambiguous encircle actions can be disambiguated on the basis of context. Circles 148a-148d represent choices for the user.

The system of the present application exploits an alternative structure selection protocol (e.g., the tap cycle select technique) which employs a lattice hierarchical structure, such as described in U.S. Pat. No. 6,903,751, entitled "System And Method For Editing Electronic Images," by Saund et al.; and U.S. Pat. No. 5,553,224, entitled "Method For Dynamically Maintaining Multiple Structural Interpretations In Graphics System", by Saund et al. The first tap causes the most likely selectable object supported by the digital ink object under the tap to be selected. Which alternative is considered most likely among the possible choices, and therefore displayed first, is a design parameter that can be tuned in the system. For concept maps, nodes and links are considered the most salient objects. Repeated taps in approximately the same place cycle through other alternatives. Once some material has been selected, tapping over other markings causes their respective structure objects to be added to the highlighted selection.

Figure 8:
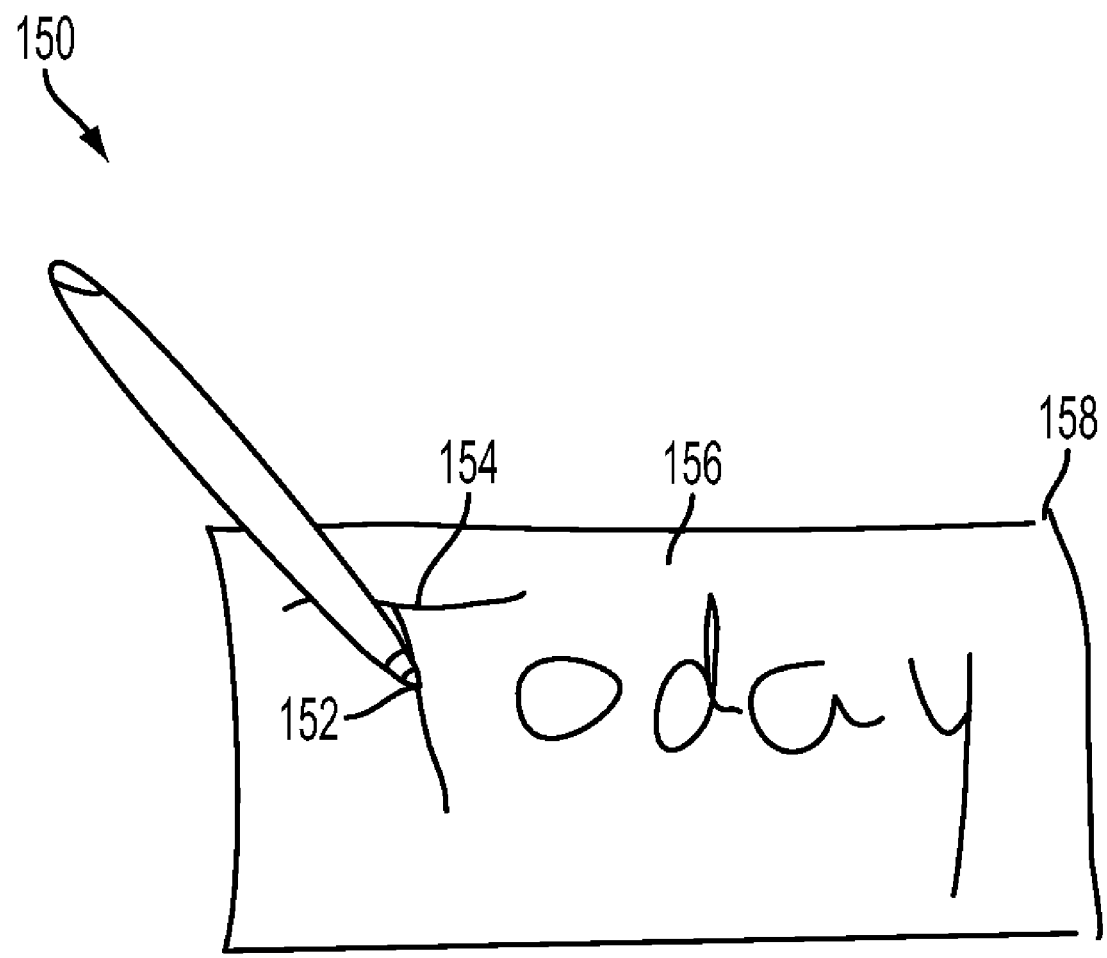
FIG. 8 depicts the tapping operation and the ambiguity associated with such selection.

Thus, as may be understood from the preceding discussion, any given piece of digital ink may be part of multiple structured objects in the domain of node-link diagrams (e.g., concept maps). For example, for the image. 150 of FIG. 8 a pen tap on stroke 152 could indicate the letter "T" 154, the word "Today" 156, or the node in the concept map consisting of the word "Today" and its enclosing rectangle 158. The user can use repeated tapping to obtain the desired selection. More particularly, the tap cycle select technique is used to select the intended strokes.

When image material (e.g., ink strokes) is selected, a small local button or icon is placed nearby. Tapping on this button or icon brings up a pop-up menu of available operations. In a TabletPC GUI implementation pie menus were used because of their ease of operation, self explanatory nature, and rapid open-loop execution of commands, of course other menus such a drop-down menus may also be used. Available commands include formalize/roughen (i.e., convert between digital ink and formatted graphics and text), cut, delete, and change color, among others. Additionally, drag handles are provided for rotating and scaling selected material, and anytime material is shown as selected, it may be moved by placing the pen on any highlighted object and dragging.

Correction of erroneous handwriting recognition is initiated by scratching out or otherwise selecting incorrect letters, words, or blocks of text. These are deleted and the next text entry is mapped to the location where the deleted text had been located. In some cases, previous alternative handwriting recognition results are displayed in a menu for the user to select.

Note that under this design the user may directly draw either graphics or handwritten text at any time, in any order, without having to deliberately indicate to the system whether they are entering a node, a link, a node label, a link label, annotation text, surrounding doodles or graphics, etc. There is no requirement that shapes be drawn in a single stroke or for multiple strokes to be drawn in a particular order. No toolbars or global menus are involved in the core operation of this interface. All menus are local and context sensitive. Correct recognition of node-link structure and handwriting enhances productivity via the system's ability to interpret selection tap input as sets of ink strokes comprising meaningful node and link objects, which in general will include combinations of closed shapes, straight or curved lines, arrows, and text labels. But failure of recognition does not prevent the user from selecting material they want to operate on by employing more deliberate encircling and tap selection of precisely the ink strokes they intend. Thus this UI design is resilient with respect to the recognizer's capabilities while putting the user always in control.

4. Architecture 4.1 Architecture Solution

The system architecture of the present application is described from three perspectives: (i) the functional organization of system modules, (ii) specification of the functions performed by each module, and (iii) the interfaces governing communication between the modules.

An overview of the functional organization or architectural of the UI 60, and the relationship between GUI module 62 and Recognition module 64 has been introduced in FIG. 3. The GUI module 62 handles input and display of digital ink strokes on the canvas, and most of the command interaction logic of the system such as detecting encircling strokes, and presenting and handling pop-up buttons (as illustrated in FIG. 7). The GUI module 62 may be implemented in a different programming language and runtime environment than the Recognition module 64, as long as they can communicate.

The Recognition module 64 handles interpretation of the user's input markings in terms of words, lines, and columns of text, graphic objects, and the document model of node-link diagrams. A specific purpose of the Recognition module is that it provides the system functionality by (i) providing intelligent selection via tapping, encircling and scratchout operations; (ii) formalizing of items; (iii) the moving of objects so links will follow the nodes they point to; and (iv) permit the exporting of the node-link (e.g., concept map) structure.

The two layers can run as different threads and therefore asynchronously in the operating system. The GUI module 62 is designed to be fast and responsive to user input, and display digital ink promptly as events are received from the pen, stylus, or mouse. In a separate thread, the Recognition module 64 can perform computationally intensive operations that may take considerable time to complete (on the order of several seconds).

Communication between the two layers is of at least two forms. First, descriptions of digital ink strokes are passed back and forth via buffers, or stroke queues. Second, selection and command operations are communicated via a defined interface. For efficiency, during operation selection and command operations do not pass digital ink strokes. Instead, the GUI and Recognition modules maintain representations of the existing strokes in synchrony with one another, named by common Identity or IDs. When strokes are referred to, only their IDs need to be passed, not the entire listing of points belonging to each stroke.

Figure 9:
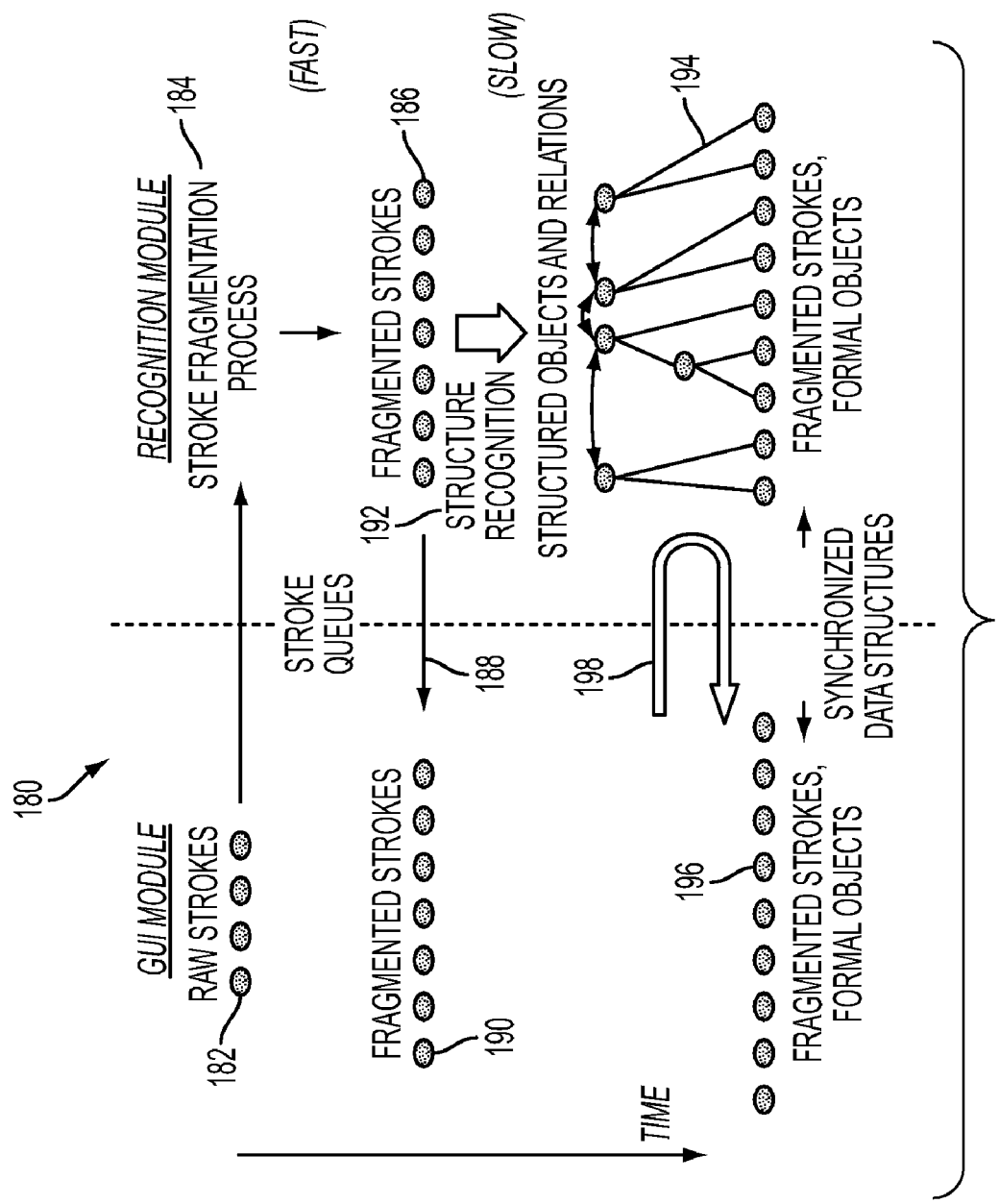
FIG. 9 elaborates on the relationship between the GUI module (layer) and Recognition Module (layer)

Process flow diagram 180 of FIG. 9 elaborates on the passing of stoke data between the modules of FIG. 3. In order for recognition grouping processes to operate effectively, and users to achieve fine-grained control over their diagrams, the original input strokes drawn or written by users must be broken into smaller fragments. This may not be done in real time as the user is writing, but with some delay. The stroke queues are used to hold raw and fragmented strokes until their respective recipient processes are ready to accept them.

With more particular attention to flow diagram 180, the UI layer provides raw strokes 182 to the unprocessed (raw) strokes queue. These strokes are provided to the Recognition layer for a stroke fragmentation process 184. The stroke fragmentation process fragments the strokes 186 and places these strokes on a processed stroke queue 188, which may be then used to replace the existing stroke information on the canvas, with the processed fragmented strokes 190. As can be seen by FIG. 9, the operations up to step 190 occur relatively in realtime. This permits a user to continually draw on the canvas without waiting for system updates or delays. However, this portion of the system does not provide "intelligence", to the image on the canvas (i.e., it does not allow rough sketches to be formalized, objects to be moved, colored, cut, etc.). To obtain this capability, the fragmented strokes 186 shown on the Recognition layer side of the figure (in the system they are held in one of the strokes queues) have structure recognition operations 192 applied thereto. These structure recognition operations can occur in a temporally desynchronized manner from the writing and drawing steps undertaken by a user. Particularly, as previously noted, the processed fragmented strokes 190 may be displayed on the canvas at the same time the same fragmented strokes in the Recognition layer are undergoing structure recognition operations, whereafter, the fragmented strokes are provided with formal objects and relationships 194. Once the structure recognition operations have been competed on the particular fragmented strokes in question, they are again shown on the GUI layer side of the figure as fragmented strokes, formal objects 196, provided to the GUI layer via an interface of the system 198. By this design there is synchronization between data structures in the GUI layer and the Recognition layer.

4.2 Pre-Interpreting Drawn Strokes

Figure 10:
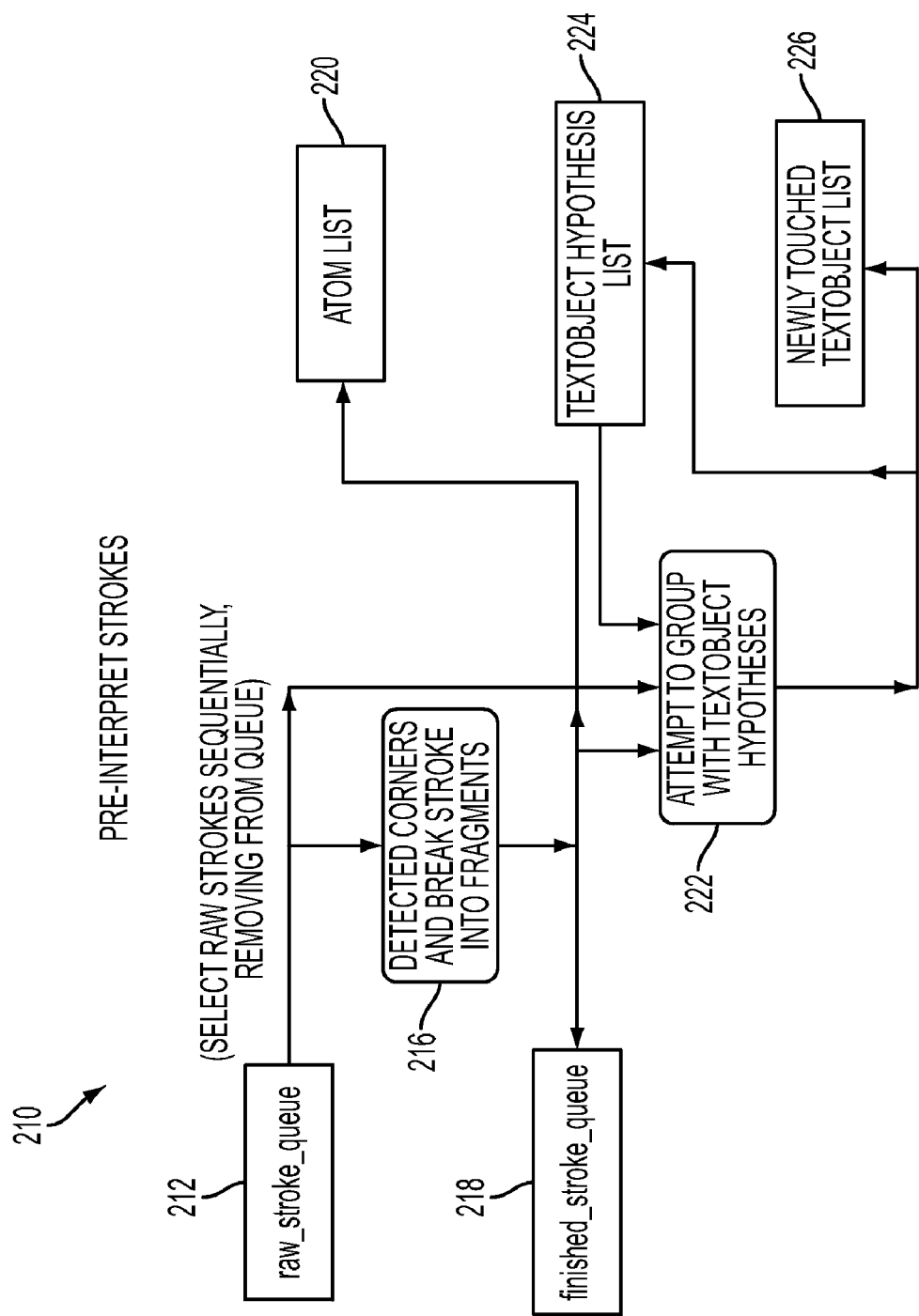
FIG. 10 sets forth the more detailed view of the pre-interpret operation of the present application.

The process of breaking raw strokes into fragments and establishing a synchronized list of stroke fragments in the GUI and Recognition modules as performed by the "Pre-Interpreting" command is detailed in flow diagram 210 of FIG. 10. The Pre-Interpret operation includes logic for creating and updating initial hypotheses in the Recognition module about which groups of strokes form handwritten words, or "Text Objects".

With continuing attention to FIG. 10, when the pen touches the screen, the GUI module initiates a new "PenPath" object. As the pen is dragged, points are added to the path. When the pen is lifted the GUI module determines whether the PenPath object is a Tap or a Stroke. If it is a Stroke, the GUI module determines whether the stroke encircles other strokes. If not, the PenPath object is assigned an ID (the raw-penpath-id) and is placed on the unprocessed (raw) strokes queue 212.

At some point the Recognition module is invoked in a separate thread. In one embodiment, if it is not already running the Recognition module is started after the pen is lifted after drawing a stroke. Because recognition can be time-consuming, unprocessed strokes can be in the queue, and in this situation the Recognition module will take them in larger but less frequent reads of the unprocessed strokes queue. Alternatively, the Recognition module may be in a constant gathering configuration, where it will be constantly testing to see if there are any unprocessed strokes, and will immediately act to process such strokes.

The Recognition module removes strokes from the unprocessed stroke queue 214 and breaks the strokes into smaller fragments, which may be called "finished strokes" or "fragmented strokes" 216. A multi-scale corner detection algorithm is applied to determine where the breaks should be. Such algorithms are well known in the art and any of those known may be used for this process. The finished strokes maintain pointers to the original raw "parent" stroke that each was derived from. Each finished stroke is assigned a unique ID. The new finished strokes are placed on the processed (finished) strokes queue 218. They are also stored in a copy of the canvas maintained in the Recognition module, and in this state are called "Atoms", stored in an Atom list 220.

The GUI process selectively queries the processed strokes queue. If any processed strokes are present, then it removes these strokes' parent raw strokes from the canvas and replaces it with the processed smaller finished strokes.

After this cycle, the GUI module and Recognition module each have identical copies of finished (processed) strokes and their associated shared IDs. The IDs provide means for the two modules to communicate about strokes with each other, via stroke IDs.

Along with breaking raw strokes into fragments, in the Pre-Interpret stage the Recognition module also forms groupings 222 of finished strokes that could belong to the same handwritten word. These are Text Object hypotheses and are stored in a Text Object hypothesis list 224. Methods for determining the grouping of digital ink strokes into words are known in the art and available in the literature. In general, because of the variability of human writing, no hard-and-fast rules can unequivocally form groupings that correspond to human interpretation. Instead, multiple hypotheses will be generated.

For each new stroke, the process works to determine whether the new stroke clearly belongs to an existing Text Object, clearly does not belong to an existing Text Object, or is ambiguous. If the stroke is ambiguous then two new hypotheses are created, one in which the stroke is added to the pre-existing Text Object hypothesis list 224, and one in which the stroke spawns a new Text Object, which will be placed in a newly touched (also at times referred to herein is spatially transformed)Text Object list 226. This process can potentially lead to an explosion of hypotheses so the implementation of this strategy must be handled with care. There are a number of procedures to limit the hypothesis, for example, a straightforward manner would be to simply include a maximum allowable hypotheses value. Alternatively, a time limit for hypotheses generation may be included. These are just two of any number of hypotheses restrictions which could be included in the present system.

Figure 11:
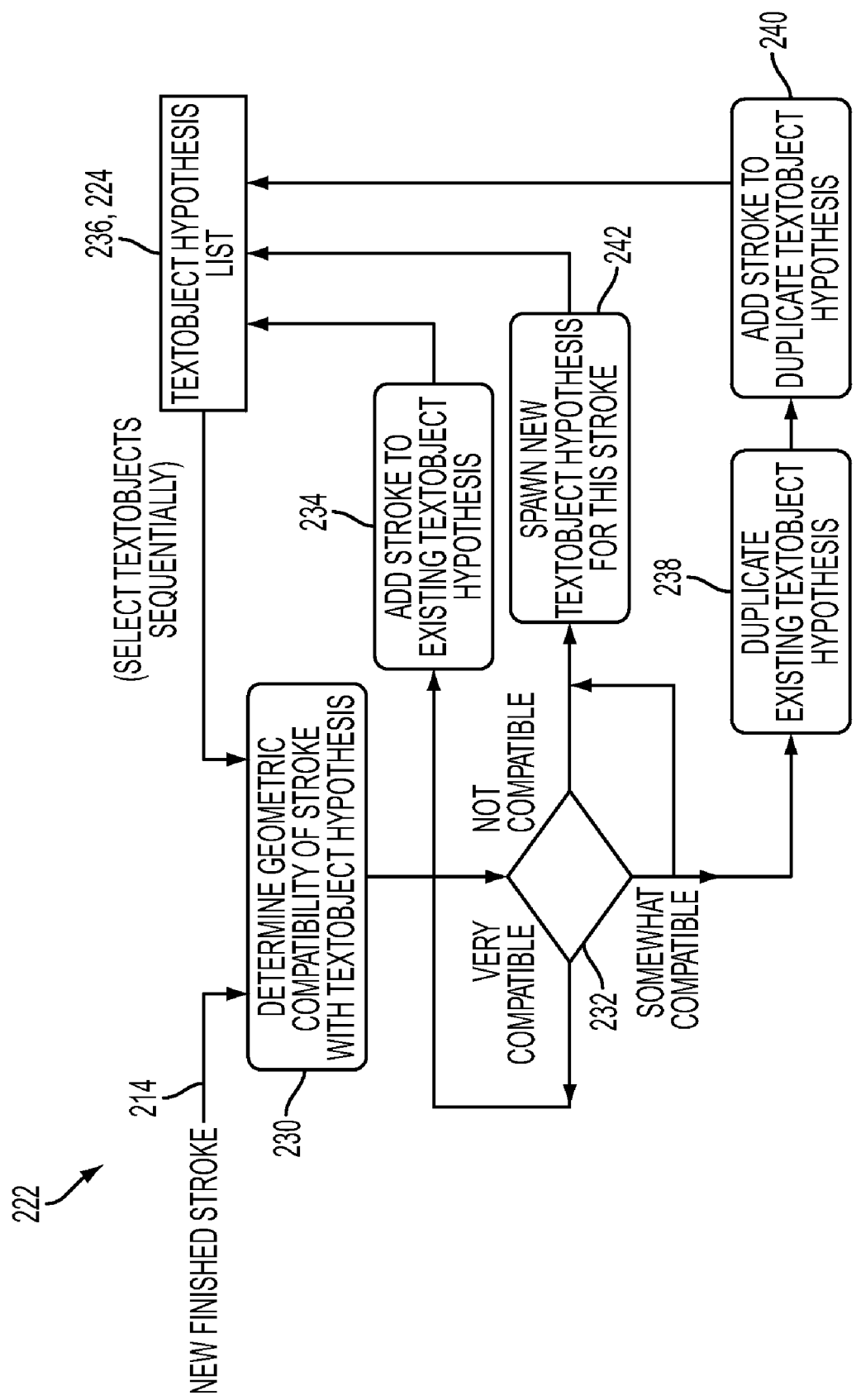
FIG. 11 sets forth the grouping operation of FIG. 10 in greater detail.

FIG. 11 illustrates in more detail the grouping of strokes with Text Object hypotheses, as introduced in block 222 of FIG. 10. The new finished stroke 214 is investigated to determine geometric compatibility of the stroke with the existing Text Object hypothesis 230, by supplying the stroke to a decision block 232, which determines if the stroke is "very compatible", "somewhat compatible" or "not compatible". When it is found to be "very compatible" the process moves to add the stroke to the existing Text Object hypothesis 234, and it is then added to a list 236 (or 224 of FIG. 10). If in step 232 the stroke is found to be "somewhat compatible", the process will duplicate the existing Text Object hypothesis 238, add the stroke to the duplicate hypothesis list 240, and also add it to the existing list 236. When the determination is that the stroke is "not compatible" the process spawns a new Text Object hypothesis 242, and it is added to the list of all hypotheses 236.

4.3 GUI/Recognition Module Interface

The GUI and Recognition modules are designed to work with each other through an Interface protocol. In one embodiment the protocol is called IConceptSketchRecognizer (I stands for the Java Interface declaration).

From the GUI's point of view, the primary job of the Recognizer is twofold: first, help the GUI decide what objects to display as selected when the user performs selection gestures, and second, provide formalized or informal objects to display when the user issues Formalize or Roughen commands. A number of ancillary functions are also provided.

An embodiment of the IConceptSketchRecognizer interface 250 implemented by the Recognizer module is shown in FIG. 12. These are all methods to be implemented by any Recognition module. These methods are called by the GUI. Some of the methods return values, others operate by side effect (like removing and placing strokes on queues).

Specific functions of the Interface 250 are as follows:
Adding Strokes (252) via the raw-strokes-queue.
As the GUI module collects digital ink from the pen input device, it is represented on the GUI side as "raw strokes". These are placed on the raw-stroke-queue.
Pre-Interpreting Strokes (266):
preInterpretStrokesInInputStrokeQueue( );

The Recognition module implements a message passing method called preInterpretStrokesInInputStrokeQueue( ); This may be called deliberately by the GUI, or it may be invoked automatically through a scheduler. The Recognition module pre-interpretation process removes strokes from the raw-strokes-queue and places strokes on the processed (finished) strokes queue. These finished strokes may be identical to raw strokes obtained from the raw strokes queue, or they may be new strokes which are fragments of the raw strokes. Typically the fragments will be due to breaking the original raw strokes at corners.

The GUI module continually tests for finished strokes on the processed (finished) strokes queue. When it finds finished strokes there, it removes them from the queue and replaces any obsolete raw strokes with new finished strokes. All raw and finished strokes maintain internal IDs which enable the GUI and Recognizer modules to keep track of them.

In one implementation of the architecture, the GUI module and Recognition module maintain separate, synchronized copies of the finished strokes, using hash tables or other known techniques to maintain the cross-references.

Structure Recognition (268):
performStructureRecognitionOnPreprocessedStrokes( );

The Recognition module implementation of structure recognition is imperceptible to a user. Its only visual effect will be reflected when objects are selected and formalized.

Tap Selection (258): public int[] selectTap(Point p, boolean b_last operation_was_select_objects);

The selectTap method is called by the GUI to tell the Recognition module that the user has tapped the pen at a certain location on the canvas, indicated by the x-y location of Point p. The GUI then decides what strokes the user intended to select, and returns an array (e.g., int[] array) with the IDs of these strokes. Under the Inferred Mode protocol, this decision is based on any stroke located under or in the near vicinity of Point p, and the recognized groups that this stroke belongs to. The smarter the Recognition module is, the smarter it will be about identifying sensible sets of strokes the user intends to select when they tap at various locations on the canvas.

The second argument, b_last_operation_was_select_objects, contributes to the intuitive selection logic of the Inferred Mode protocol. When true, it informs the Recognition module that the user is selecting multiple objects by sequential tapping, depending on the location of the tap point, and therefore the IDs of already-selected strokes should be included in the list of selected strokes returned by the call. If false, it indicates that the IDs of currently selected strokes should be discarded before building the list of selected strokes to be returned.

Enclosure Selection (254): public int[] selectPath(Path path)

The selectPath method allows selection of strokes by drawing a closed path around them. The decision about whether a closed path stroke is ambiguous by virtue of enclosing other strokes, and therefore requiring a "Select?" mediator under the Inferred Mode protocol, is left to the GUI. The selectPath method is only used to cause the enclosed strokes to be considered selected by both the GUI and Recognition modules. The GUI will typically render the selected strokes as highlighted in some fashion.

Deleting Strokes (256): public int[] deleteStrokes(int[] stroke-ids);

deleteStrokes is called by the GUI to cause certain strokes to be removed from the canvas. The Recognizer module must deal with deconstructing whatever recognized structure these strokes participated in. The return int[] is the IDs of strokes deleted from the canvas, and should be identical to the int[] stroke-ids passed.

Scratchout (260): public int[] scratchOut(PenPath scratchout-path);

The scratchOut method is called by the GUI when it suspects the user has drawn a stroke intended to be a scratch-out gesture (typically a zig-zag). The Recognition module is then required to determine exactly which strokes the user probably intends to delete, as determined by the path of the scratch-out gesture and the structural groups the recognition algorithms have constructed. The argument, PenPath scratchout-path, is a listing of points (including their time stamps) of the gesture. The smarter the recognition module is, the better it will be at recognizing the user's intent even when they have drawn ambiguous scratch-out gestures.

The return value is a data structure containing the stroke IDs (e.g., an int[] array). Normally the GUI should display these as highlighted along with a confirmation button saying something like, "Delete?". If tapped on, the GUI will then pass these stroke IDs to the Recognizer as arguments to the deleteStrokes method.

Formalization (262): public String formalizeObjects(int[] stroke-ids);

The formalizeObjects command could also be called beautifyobjects. This causes the selected informal finished strokes passed in the int[] stroke-ids argument to be replaced by formal graphic objects such as circles, ellipses, rectangles, polygons, arrows, arcs, and formatted text. It is up to the Recognition module to figure out what recognizable objects are included among the stroke-ids passed, and how they should be replaced with formal objects.

The String returned is an XML string that needs to be parsed by the GUI for it to know what to do. The XML string contains three kinds of tags: <introduce-object>, <remove-object>, and <add-object>. The <introduce-object> command informs the GUI that a new primitive, or atomic object is to be used by both the GUI and Recognition module sides. The objects that are introduced include formatted text string, and graphic objects of type rectangle, ellipse, polygon, polyline, arc, and arrowhead. Of course, other types could also be introduced. Every object introduced will be given a unique object ID, similarly to stroke IDs. The <remove-object> tag is followed by a list of atomic object IDs (normally stroke IDs) that should be removed from the canvas, indicated by their IDs. The <add-object> tag indicates which objects should be added to the canvas.

When some or all of a hand-drawn diagram is first formalized, the formal graphic objects will be introduced and then added. But once formalized, the user can toggle back and forth between formal and rough versions with already-created objects simply being added or removed from the canvas.

Roughening (264): public String roughenObjects(int[] object_ids);

The roughenObjects command is the inverse of the formalizeObjects command. The object IDs of selected objects are passed in the int[] object_ids argument. These could be formal objects or raw strokes. When it receives a roughenObjects command the Recognizer determines which formal objects should be removed from the canvas and which strokes should be added.

The XML String returned is identical in syntax to the XML string returned by the formalizeObjects command, but typically will include only <remove-object> and <add-object> tags.

Transforming (270): public String affineTransform(int[] object-ids);

The affineTransform command is used to communicate to the Recognizer module translation, scaling, stretch and rotation transformations to selected objects on the canvas. The recognition module is involved because it possesses the knowledge of the diagram's node-link structure, and is therefore in a position to direct how link graphics should be updated to follow the nodes they are attached to as the nodes are moved or otherwise transformed.

5. Recognition Algorithms

In order to carry out its role with regard to the GUI/Recognition interface, the Recognition module recognizes the graphical objects, textual content, and spatial structure of the diagram. This occurs in two stages. The first stage, the Pre-Interpret stage, as previously described, operates quickly in response to new strokes being added to the canvas. The Pre-Interpret stage breaks raw strokes into smaller fragments, and forms TextObject hypotheses. The second stage, called Structure Recognition, can require more processing time and operates asynchronously with the user's writing and drawing. Structure recognition is where the users' strokes are interpreted in terms of a diagrammatic domain model, namely a node-link diagram regarded as a concept map.

A high-level view of node-link diagram structure recognition includes a paradigm for the Recognition module, wherein:

(i) the strokes are fragmented if necessary;
    (ii) related strokes are grouped to form multiple hypotheses reflecting structured interpretations of the strokes (strokes are determined to be related based on any of a number of similarity characteristics, including but not limited to shape similarity and location proximity);
    (iii) hypotheses have confidence scores applied based on local evidence (e.g., intrinsic scores);
    (iv) the hypotheses have confidence scores applied in accordance with interacting support such as surrounding strokes (e.g., support-context score);
    (v) the hypotheses form a lattice according to their support relations;
    (vi) constraints are applied among the competing hypotheses; and
    (vii) a search is made for hypotheses, under the applied constraints, having collectively high scoring assignments (e.g., based on an accept/reject value inquiry, hypotheses which have a higher accept value than other competing hypotheses), and;
    (viii) accepted hypotheses with collectively high scoring assignments form a subset hypothesis lattice which represents an interpretation of the node-link diagram.

5.1 Structure Recognition on Preprocessed Strokes: Form Structure Hypotheses

Structure recognition occurs by grouping atomic stroke objects into more complex objects. The rules for grouping must be tolerant to variability and noise, and many hypotheses for complex objects are constructed. This form a lattice 310. Then, an optimization procedure operates to select the combination of hypotheses that achieves collectively a best score, and obeys certain constraints to select a subset of the hypothesis lattice (e.g., 330 of FIG. 15).

In general, each complex object will be "supported" by one or more simpler objects. Sometimes these simpler objects will fulfill defined roles in the more complex objects (e.g., a wedge will act to support a more complex object of an arrowhead).

For the node-link concept sketching domain, the ontology of graphical and textual objects and parts 280 which have been defined in the present application is presented in FIG.

13. More particularly, the ontology of graphical and textual objects are built from atoms to molecules, to Graph Nodes and Graph Links of Node-Link Diagrams (as will be seen in more detail in FIGS. 14 and 15).

Figure 13:
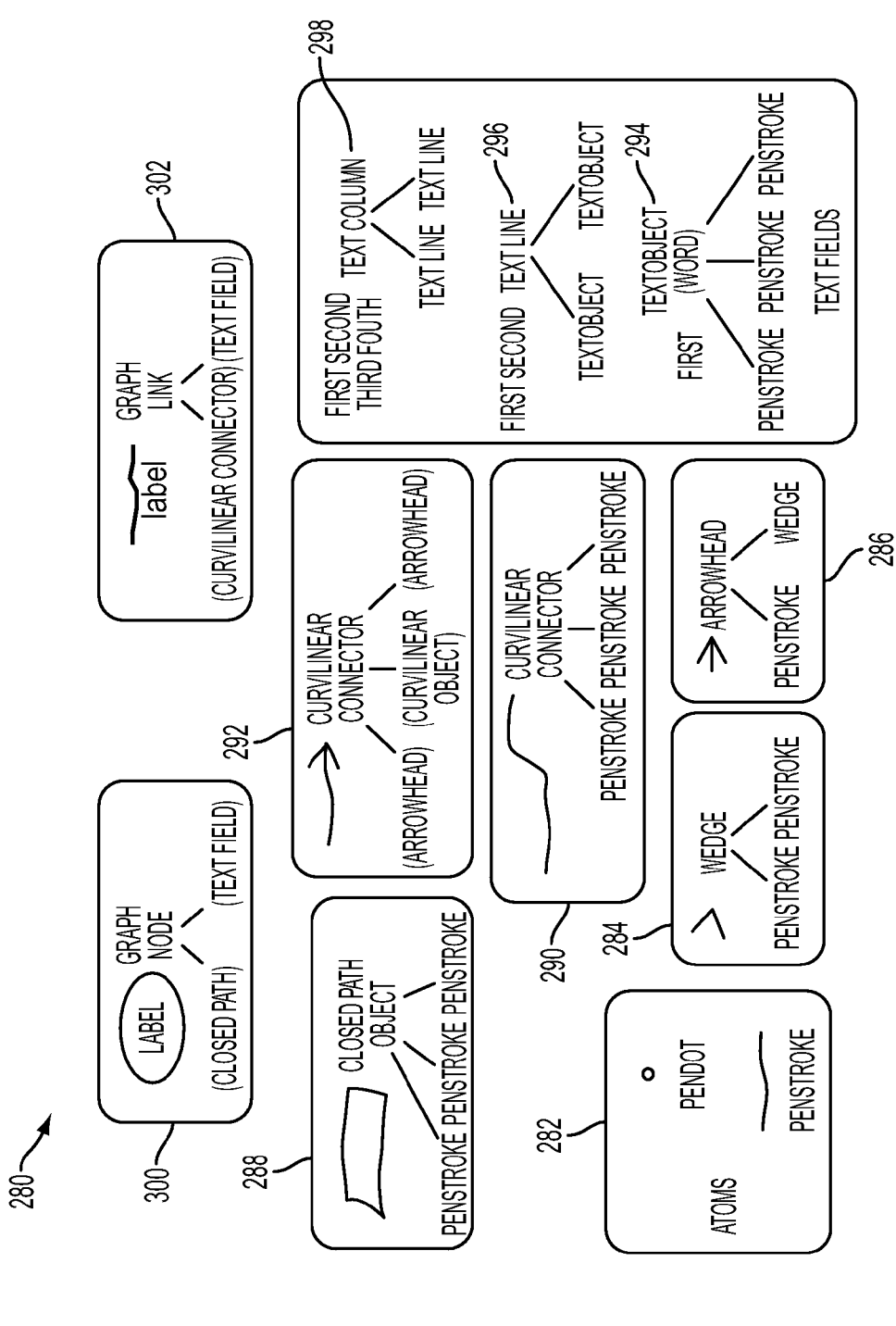
FIG. 13 shows the ontology for the node-link diagram structure to which the concepts of the present application are directed.

With specific attention to FIG. 13:

Atomic Stroke (282): This is a fragmented digital ink stroke obtained by breaking up raw strokes at corners. Very short isolated strokes are called PenDots, longer strokes are called PenStrokes.

Wedge (284): A Wedge is formed by a pair of PenStrokes of approximately the same length that meet at a corner.

Arrowhead (286): An Arrowhead is formed by Wedge and a PenStroke that meet at a corner, where the PenStroke must fall between the sides of the Wedge.

CurvilinearObject (290): A CurvilinearObject is a chain of PenStrokes that form a non-self-intersecting open path.

CurvilinearConnector (292): A CurvilinearConnector is an open path, a single PenStroke or multiple PenStrokes chained end-to-end. A CurvilinearConnector contains optional roles for TerminatorGraphics, or objects that can serve as terminators of a connector, such as an arrowhead. Of course, other forms or items can serve as terminators.

ClosedPathObject (288): A ClosedPathObject is a chain of PenStrokes that forms a non-self-intersecting closed path or nearly closed path. A closed path generally must be of a relatively simple and compact shape in order to be considered a ClosedPathObject; long snaky closed paths are not considered.

TextObject (294): A TextObject is a set of PenStrokes and PenDots that form a compact elongated clump, roughly corresponding to a handwritten word.

TextLine (296): A TextLine is a group of TextObjects aligned roughly end-to-end, normally along a horizontal line.

TextColumn (298): A TextColumn is a vertical stacking of TextObjects and/or TextLines.

Graph Node (300): A GraphNode contains two main roles, a Node-Graphic and a Node-Label. At least one of these roles, and optionally both, are filled in order for a GraphNode to be supported. In one embodiment, the Node-Graphic role may be filled by a ClosedPathObject, and a Node-Label role may be filled by a TextObject, TextLine, or TextColumn. In the same embodiment, both roles are filled for a GraphNode, then the text is enclosed by the ClosedPathObject. In addition, a GraphNode maintains pointers to GraphLinks that are associated with it (point to it). Of course, other embodiments may have different arrangements.

GraphLink (302): A GraphLink contains two roles, a Link-Graphic and a LinkLabel. The LinkGraphic role must be filled by a CurvilinearConnector. The LinkLabel role may be filled optionally, by a TextObject, TextLine, or TextColumn. In addition, a GraphLink maintains a list of the GraphNodes that may be associated with (pointed to by) either end.

Not shown in FIG. 13, is a Graph Node association, but which is understood to be used in conjunction with the present concepts.

For each of these types of objects, methods are used to form object hypotheses from whatever simpler objects are present to support it. In addition, each object obtains an intrinsic score depending on how well the support objects meet defined criteria such as shape and size requirements for that object type. For example, in our implementation hypothesized TextObjects obtain an intrinsic score of either 0.1, 0.5, or 0.9, depending on the confidence score (low, medium, or high) of the Microsoft Handwriting Recognizer program called via the Microsoft TabletPC API. ClosedPathObjects are scored based on criteria developed in the paper, E. Saund, "Finding Perceptually Closed Paths in Sketches and Drawings," IEEE Trans. Pattern Analysis and Machine Intelligence, V. 25, No. 4, April 2003, pp. 475-491. Wedges and Arrowheads are scored on heuristic criteria based on the geometry of their respective parts. Other score setting schemes are known and can be used in conjunction with the concepts of the present application.

Figure 14:
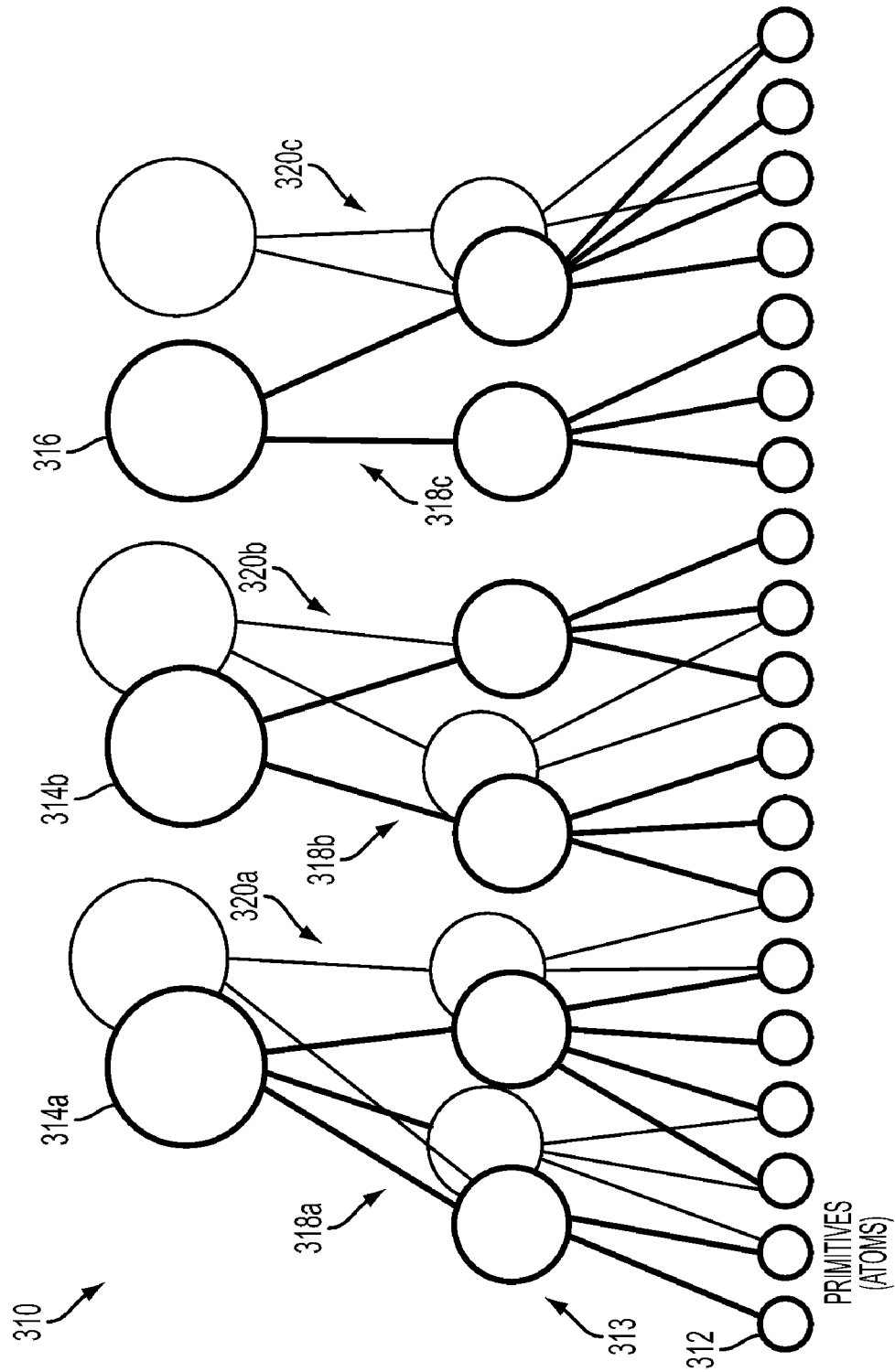
FIG. 14 illustrates the multiple or forest of structure hypotheses which are obtained during the structure recognition process.

The way objects are built from one another is illustrated in an example hypothesis lattice 310 in FIG. 14, which shows an object structure hierarchy for a set of digital ink strokes.

The algorithms for grouping simpler objects into more complex objects, starting with PenStrokes and PenDots (e.g., Primitives or Atoms) 312 to molecules 313, working up to GraphNodes 314a, 314b and GraphLinks 316, will in general produce many hypotheses (i.e., a lattice of hypotheses) from which a subset of hypotheses must be selected. For example, the dark (bold) chains 318a, 318b, 318c are considered accepted hypotheses, while the lighter (non-bold) chains 320a, 320b, 320c are discarded hypotheses. The set of accepted hypotheses have a collectively high scoring assignment (compared to other competing sets of hypotheses), as being an accurate interpretation of the node-link diagram. Sometimes a poorly scoring hypothesis, such as a poorly formed Arrowhead, will turn out to be correct and effectively reinforced by top-down information if it plays a critical role in supporting a CurvilinearContour and thence a GraphLink.

Figure 15:
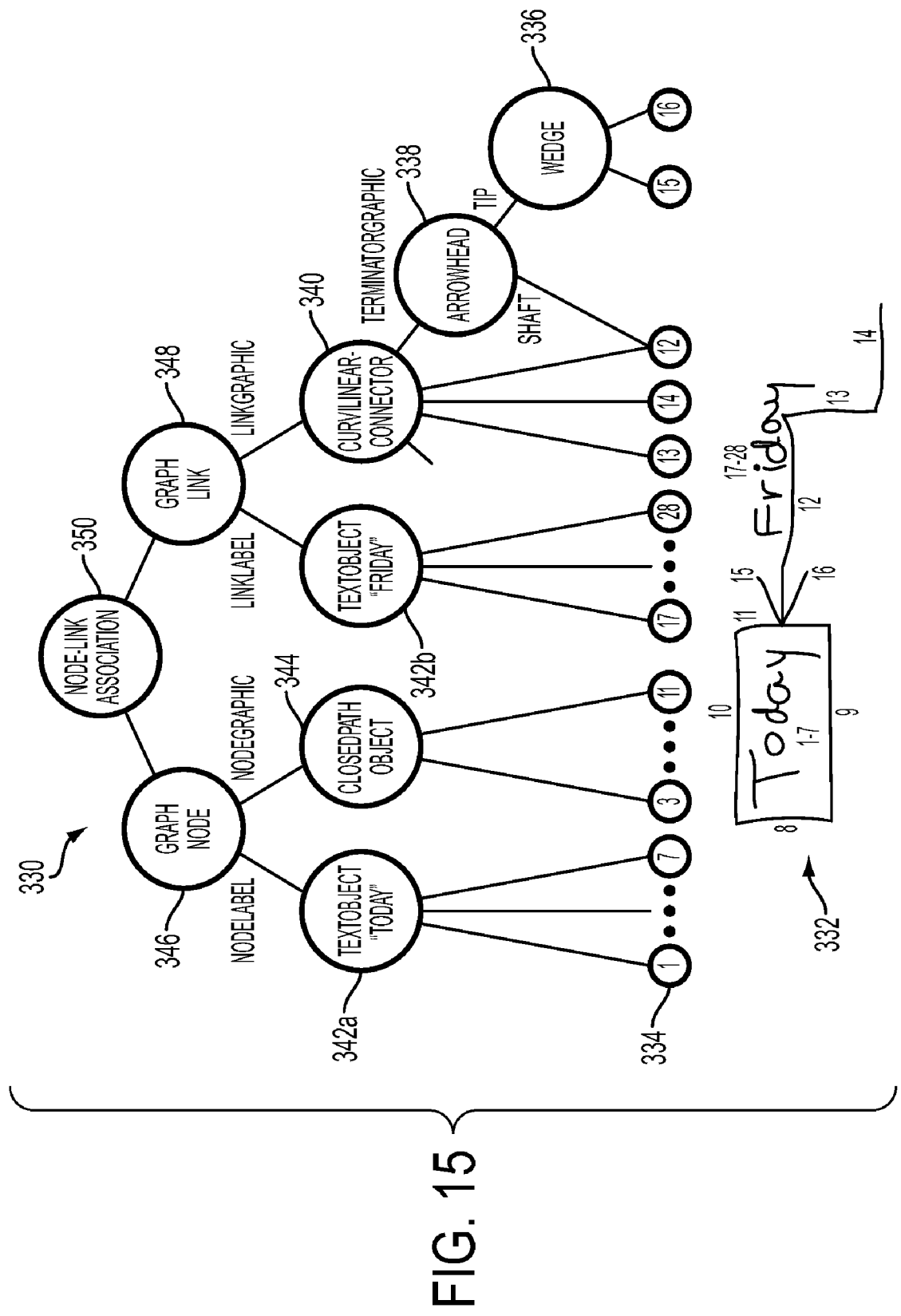
FIG. 15 sets forth a successful node-link structure hierarchy obtained by the structure recognition processing.

Turning to FIG. 15, illustrated is an accepted hypothesis lattice 330 for the node-link diagram 332. As seen, node-link diagram 332 is broken down into fragments (1-28) 334, which are grouped (e.g., 1-7, 8-11, 12, 13, 14, 15, 16, 17-28) and are then built from their simplest forms, such as a Wedge 334, to an Arrowhead 336, CurvilinearConnector 340, TextObjects 342a, 342b, ClosedPartObjects 344, up to Graph Nodes 346 and GraphLinks 348 for an overall Node-Link Association (diagram) 350. Only the correct final hypotheses are shown in the structure hierarchy; the many spurious groupings (e.g., as in FIG. 14) that may have been considered during the recognition process have been deleted.

The following describes the inputs and outputs, as well as the steps of one embodiment of a Structure Recognition procedure:

Input: new fragmented PenStrokes; newly touched TextObject hypotheses; existing TextObjects, ClosedPathObjects, Wedges, Arrowheads, CurvilinearConnectors, NLLinks, NLNodes.

Output: lists of TextObjects, ClosedPathObjects, Wedges, Arrowheads, CurvilinearConnectors, NLLinks, NLNodes.

Once the appropriate inputs have been made, the process:

1. Forms links among the proximal ends of all PenStrokes. Numerically Scores the degree to which each pair of linked PenStroke ends forms an alignment or a corner.

Figure 16:
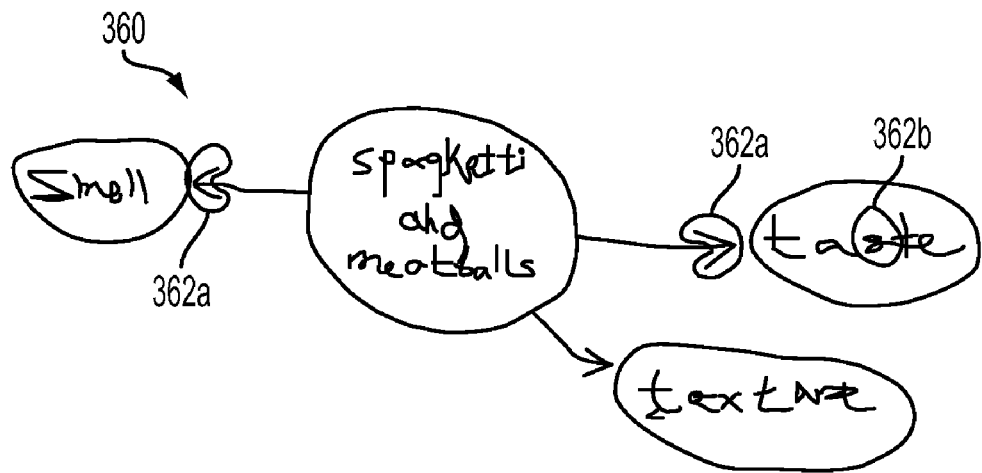
FIG. 16 illustrates the wedge hypotheses obtained by operation of the present application on a node-link diagram.
Figure 17:
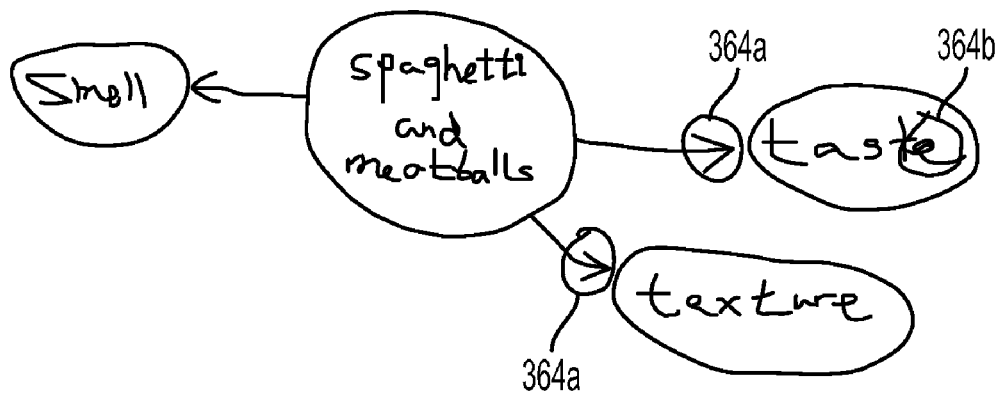
FIG. 17 illustrates the arrowhead hypotheses obtained in a node-link diagram.
Figure 20:
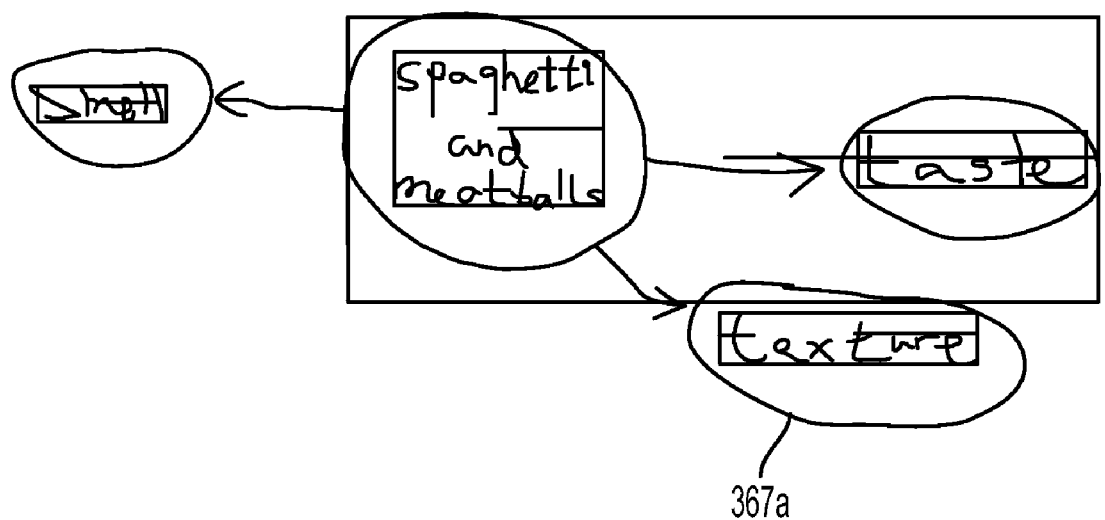
FIG. 20 depicts graph-node hypotheses obtained by the present application for a node-link diagram.
Figure 21:
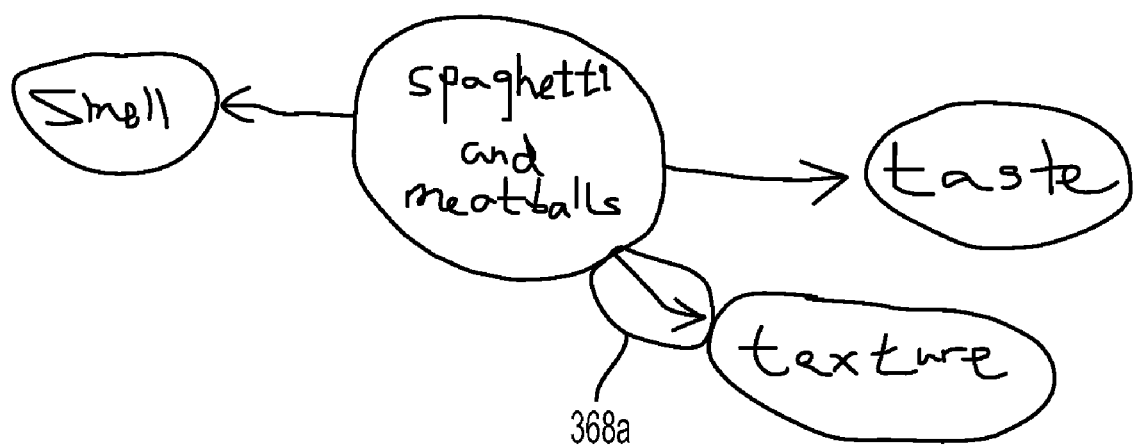
FIG. 21 illustrates graph-link hypotheses obtained by the present application for a node-link diagram.

2. Forms Wedge hypotheses (See FIG. 16, where some, but not all, wedge hypotheses identified by the process are illustrated. More particularly, the system interprets the node-link diagram 360 of FIG. 16 and identifies strokes it considers to be potential wedges. As can be seen, while some of the wedge hypotheses 362a will be True, others will be False 362b. Similar examples of hypotheses are shown in the following FIGS. 17-21). The True/False determinations are made as part of optimization processing such as accomplished in block 512 of FIG. 30, which illustrates operations in the Recognition module that modify the hypothesis lattice.

3. Forms Arrowhead hypotheses (See FIG. 17, 364a True; 364b False).
4. Forms ClosedPathObject hypotheses (See FIG. 18, 365a True).
5. Forms CurvilinearConnector hypotheses (See FIG. 19, 366a True).
6. Finds sets of strokes enclosed by ClosedPathObjects.
7. Breaks up TextObject hypotheses based on enclosure by ClosedPathObjects.
8. Removes TextObject hypotheses that are redundant with each other or with any other graphic object, based on having common support.
9. Performs handwriting recognition on all un-scored TextObject hypotheses.
10. Forms TextLine and TextColumn hypotheses from TextObjects.
11. Forms GraphNode hypotheses (see FIG. 20, 367a True) from ClosedPathObjects enclosing TextObjects, TextLines, or TextColumns (See FIG. 21, 368a True).
12. Forms GraphNode and GraphLink hypotheses from CurvilinearObjects pointing to TextObjects, TextLines, or TextColumns.

Each object will include a score and pointers to its support objects and the more complex objects it itself supports. This output will form a hypothesis lattice, e.g., 310 of FIG. 14.

There are a number of techniques available and known in the art for generating hypotheses to determine whether strokes on a canvas are of a particular object form. For example, with regard to a simple wedge hypothesis, the system could determine angles between two strokes which are in a certain proximity to each other, and the relative length of each of the strokes. These attributes would then have values applied (e.g., if the angle between the two strokes is x then the angle score is 0.1, and if the angle is z then the angle score is 0.9). From such attributes an overall score for each hypothesis is obtained. For example, in one embodiment the obtained information could be used to define a cost function of the attributes to determine the overall score (e.g., the intrinsic scores of FIG. 15). Such techniques and process as related to specific ink strokes and objects are known in the art.

Attention is now directed to the tap cycle select techniques employed herein, and an accepted hierarchical lattice such as in FIG. 15. Once an accepted lattice is formed, the atoms of the lattice are informed about which hypotheses they support. At least some of these hypotheses may be considered to be "selectables." Each atom will keep a list of selectables, which may be considered selectable group hypotheses (for example, an ink stroke atom may support a hypotheses of an Arrowhead, where the Arrowhead may be an item capable of being selected by a user). Then when a tap select command is called the atom under the tapping action is queried as to its list of selectables. With attention to FIG. 15, for example, Atom "15" supports (to at least some degree) the "wedge", "arrowhead", and "curvilinear connector", all of which would be on the selectable list of Atom "15".

The system can organize the order of the selectable list, therefore in this discussion, it is considered that the curvilinear connector is first on the selectable list. In this situation if Atom "15" is tapped, the system moves up the structural hierarchy to the curvilinear connector, and selects (e.g., by highlighting) the curvilinear connector on the canvas. However, if the user does not actually want the curvilinear connector, and may want to select the Arrowhead, another tap on Atom "15" moves the system to the second selectable on the list (e.g., which in this example is the Arrowhead), and the movement through the hierarchy is undertaken to retrieve the Arrowhead. This design allows the process to cycle through selection options. Similar functionality is available for the encircling and scratch-out actions.

Figure 22:
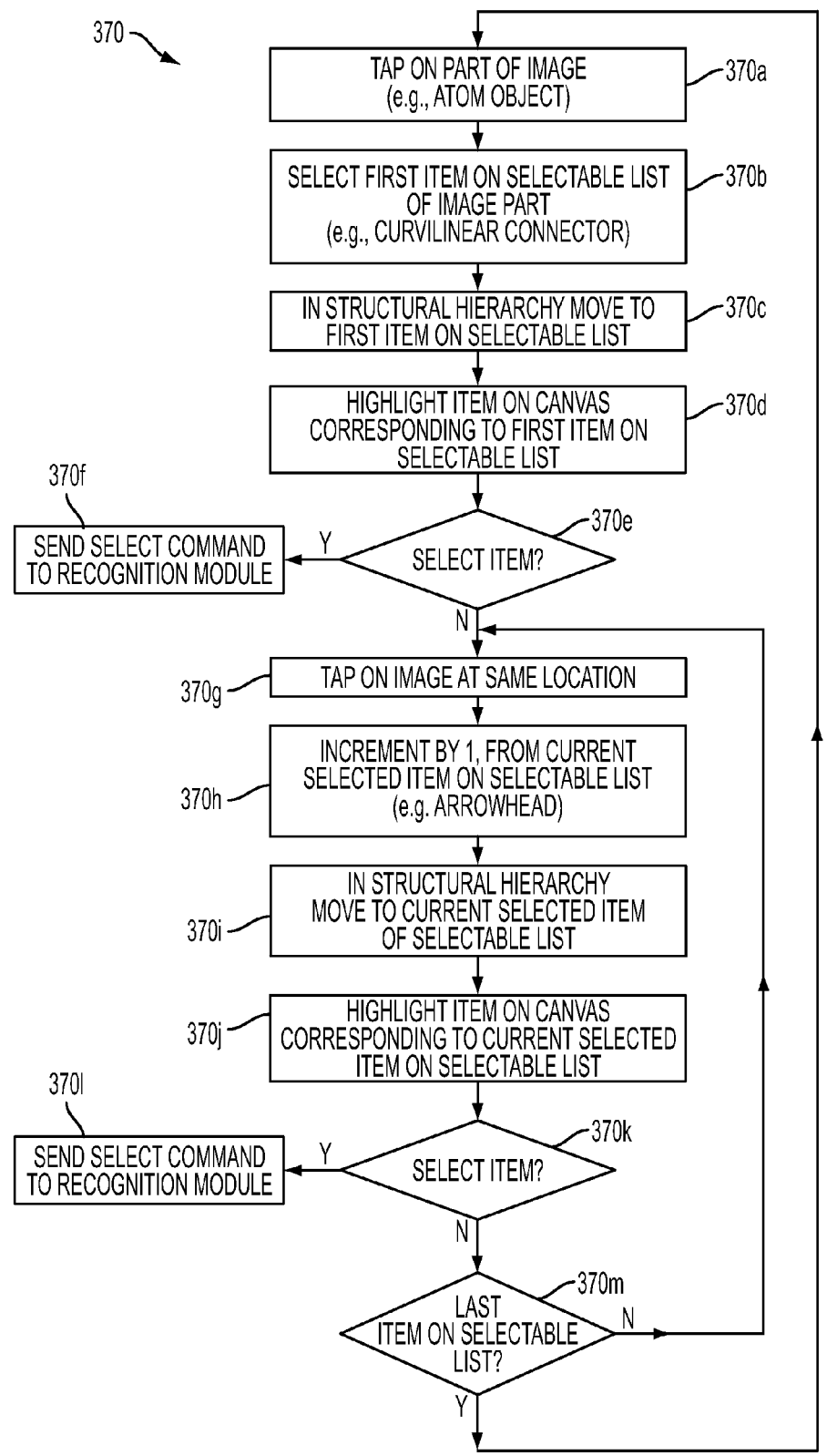
FIG. 22 is a flow diagram associated with operation of the selectables list.

Turning to FIG. 22, operations related to the above discussed a selectable list is illustrated by flow diagram 370. Initially, the user performs a tap operation on an image or part of an image (such as an atom object) 370a, causing a selection of a first item on the selectable list 370b. The system will then move through the structural hierarchy to identify the first item on the selectable list 370c and highlight that item on the canvas 370d. At this point, a decision must be made of whether or not to select the item 370e. When the decision is to select the highlighted item, the system sends a select command to the recognition module 370f. On the other hand, if the item is not selected (e.g., the user will again tap on the image) 370g, the process increments the selectable list by one to the next listed item (e.g., arrowhead) 370h. The structural hierarchy will again be reviewed to identify the current selected item from the selectable list 370i and that item will be highlighted on the canvas 370j. Another decision must then be made whether to select the highlighted item 370k. When the item is selected a select command is sent to the recognition module 370l. On the other hand, if the item is not selected, an inquiry is made whether the item is the last item is on the selectable list 370m. When answered in the negative, the user may again tap on the image 370g and steps 370h-370k are repeated. On the other hand, if it is determined the selected item is the last item on the selectable list, but the user has not selected the item, the system rotates through and again selects the selectable first item on the list upon a tapping of the stylist or pen. It is to be appreciated in some embodiments the order of items on the selectable list may be determined by the user. For example, the user may be presented with an option of ordering the selectable list from more complex objects to less complex objects, among other orderings.

With attention to another aspect of the present systems and methods provided is incremental structure recognition or incremental updating of the node-link diagram. For example, once the diagram has been drawn on the canvas, and the system has operated to automatically recognize the intelligent node-link diagram (i.e., it is an intelligent node-link diagram in the sense that it has been given functionality by the recognition operations), when additional nodes, links or labels are added or deleted from the diagram, these changes do not require the regeneration of all previously formed hypotheses. Thus, it is not necessary to rebuild the forest of hypotheses (e.g., FIG. 14) each time a change is made to an existing node-link diagram. Instead, new structure hypotheses generated due to newly added or deleted ink strokes are, if appropriate, grouped with existing structure hypotheses groups or new structure hypotheses groups are formed. Then any re-scoring (i.e., of intrinsic and/or context scores) are propagated to update the existing hierarchical lattice (e.g., FIG. 15). This incremental structure recognition also occurs when a stroke is newly touched. For example, if the user touches or selects an existing element of the node-link structure to somehow change the lattice hypotheses, a whole new forest of hypotheses and a new lattice hypothesis graph does not need to be recreated.

Processes as described above increases the speed at which a revised intelligent node-link diagram may be generated, as the system does not need to do repetitive work in rebuilding the forest of alternative hypotheses. Thus, persistence is added to the structure which is already created 5.2 Choose Globally Optimal Structure Hypotheses As mentioned, the hierarchical lattice created by the grouping procedures contain many spurious hypotheses that do not correspond to perceptually salient and meaningful objects, and do not fit together as parts of a coherent node-link diagram (see FIG. 14). A selection process operates to determine which object hypotheses to promote to the status of being an accepted interpretation (see FIG. 15), and thereby made available to the user through their Tap Selection commands, and through the Formalize/Roughen and other operations. This selection process may in one embodiment be designed to retain objects whose scores sum to a maximum or form a maximum under a similar arithmetic combination of individual hypothesis scores, under a non-overlapping support constraint. In one implementation, this constraint states that any group or atomic PenStroke must support at most one other accepted group. However, in other implementations, the non-overlapping constraint may be relaxed, for example, the non-overlapping concept may be relaxed between TextObject hypotheses and Wedge, CurvilinearObject or ClosedPathObject hypotheses to permit support of more than one other accepted group.

The optimization is performed in one embodiment by use of a procedure which searches hierarchical groups under a nonoverlapping support constraint.

The algorithm is based on search concepts whereby bounds are used to prune the search tree. Use of bounds are well known in the art, and the particular bounds employed may be determined by the specific implementations in which the preset concepts are employed. The nonoverlapping support constraint is invoked in the algorithm to further prune the search tree by dynamically vetoing branches based on decisions made higher in the search tree. The following discussion focuses on what is known in the art as depth-first search. However, it is to be appreciated other search types may be used including but not limited to "best-first", among others.

The following section describes the inputs and outputs, as well as steps of a search process which in one embodiment uses a depth-first search procedure for hierarchical groups under a nonoverlapping support constraint as follows:

Input: A hierarchical lattice of nodes. At the base of the lattice are Atomic nodes. Above them are Group nodes. Each Group node is "supported" by some number of nodes lower in the hierarchy. Each Group node is assigned two scores, an intrinsic score as described above, and a support-context score, described below.

Output: A subset of Group nodes that maximizes the sum or related arithmetic combination of support-context scores of the nodes included in the subset such that each node supports at most one node above it in the hierarchy.

1. As shown by hierarchical lattice structure 380 of FIG. 23, each atomic node (A1-A6) 382 is assigned a support-context score of 1. Scores are propagated upward from Atomic nodes such that each Group node (M1-M8) 384 has a support-context score 386, which is the minimum of its intrinsic score 388 and the minimum support-context score among its support nodes minus an epsilon value. A support-context score is assigned to a hierarchy of nodes by propagating from the Atomic nodes at the bottom and combining intrinsic scores with support-context scores of support nodes.
2. A score vector is constructed listing the support-context scores of all Group nodes. It is possible to use intrinsic scores in the score vector, but this could significantly reduce search tree pruning and therefore increase search time.
3. The score vector and the associated Group nodes are sorted from biggest support-context score to smallest. Because of the score assignment at step 1, the nodes will be ordered such that higher nodes in the lattice will come strictly after their support nodes.
4. A support-table, such as table 390 of FIG. 24, is constructed based on the hierarchical lattice, e.g., of FIG. 23. FIG. 24 illustrates how a support-table 390 encodes the support structure of a hierarchical group lattice 380. The horizontal dimension (column-index) of the table lists all of the Group nodes, in order of support-context score. The vertical dimension (row-index) of the support-table consist of Atomic nodes, plus all Group nodes that support at least one other Group node higher in the lattice. The entries of the support-table are boolean values indicating whether or not the row-indexed Atomic or support Group node supports the column-indexed Group node in the lattice.
5. An optimization search is performed under the nonoverlapping support constraint. The purpose of this search is to assign True/False values to each Group (or hypothesis) node. This is accomplished by search of a binary tree, where the left branch at each node of the tree corresponds to assigning the value True to a node, and the right branch corresponds to assigning False. The depth of the tree is the number of Group nodes (see FIG. 26).

Thus, FIG. 24 depicts an example of a hierarchical node lattice and a representation of support relations in Support Table 390. Nodes (M1, M3, M6) 392a-392c are accepted (True) while nodes (M2, M4, M6, M7, M8) 394a-394d are rejected (False). Bars 396 in the support table indicate action of the nonoverlapping support constraint to dynamically prune depth-first search.

Turning to a more particular embodiment of a depth-first optimization search under the nonoverlapping Support constraint, the following section sets forth the inputs, outputs, for such a search along with the main steps of the search (A1-A3) and greater details of the main steps (A1-A3), as follows:

Input: A vector of object scores and a support table.

Output: A labeling of True/False values for the objects, such that the sum or related arithmetic combination of object scores is maximized under the constraint that every True object supports at most one other True object according to the support table.

A1. Initialize node variables.
A2. Main Loop: Process Current Node until . . .
A3. Exit: output best node T/F assignment.

The initialization steps of A1 include:
I1. Initialize a best-score variable to 0.
I2. Initialize a cumulative-score variable to 0.
I3. Initialize a veto-count variable to 0 for each node.
I4. Initialize a current-state value for each node to "State A".
I5. Initialize the tree-pointer to the first node. The node pointed to by the tree-pointer is called the "current-node."

The Main Loop: Process Current Node, Step A2 of steps A1-A3, is described in conjunction with FIGS. 25-29, which provide details regarding processing used to obtain structure recognition. As the process iterates, a tree-pointer walks up and down a search tree, setting node values to various combinations of True and False. The process is designed to prune the search in two ways. First, the process does not explore True values for nodes that are vetoed because they fail to satisfy the nonoverlapping support constraints. Second, the process does not explore True values for nodes when the best cumulative score that could be obtained by accepting that node still falls below the best score found thus far.

Figure 25:
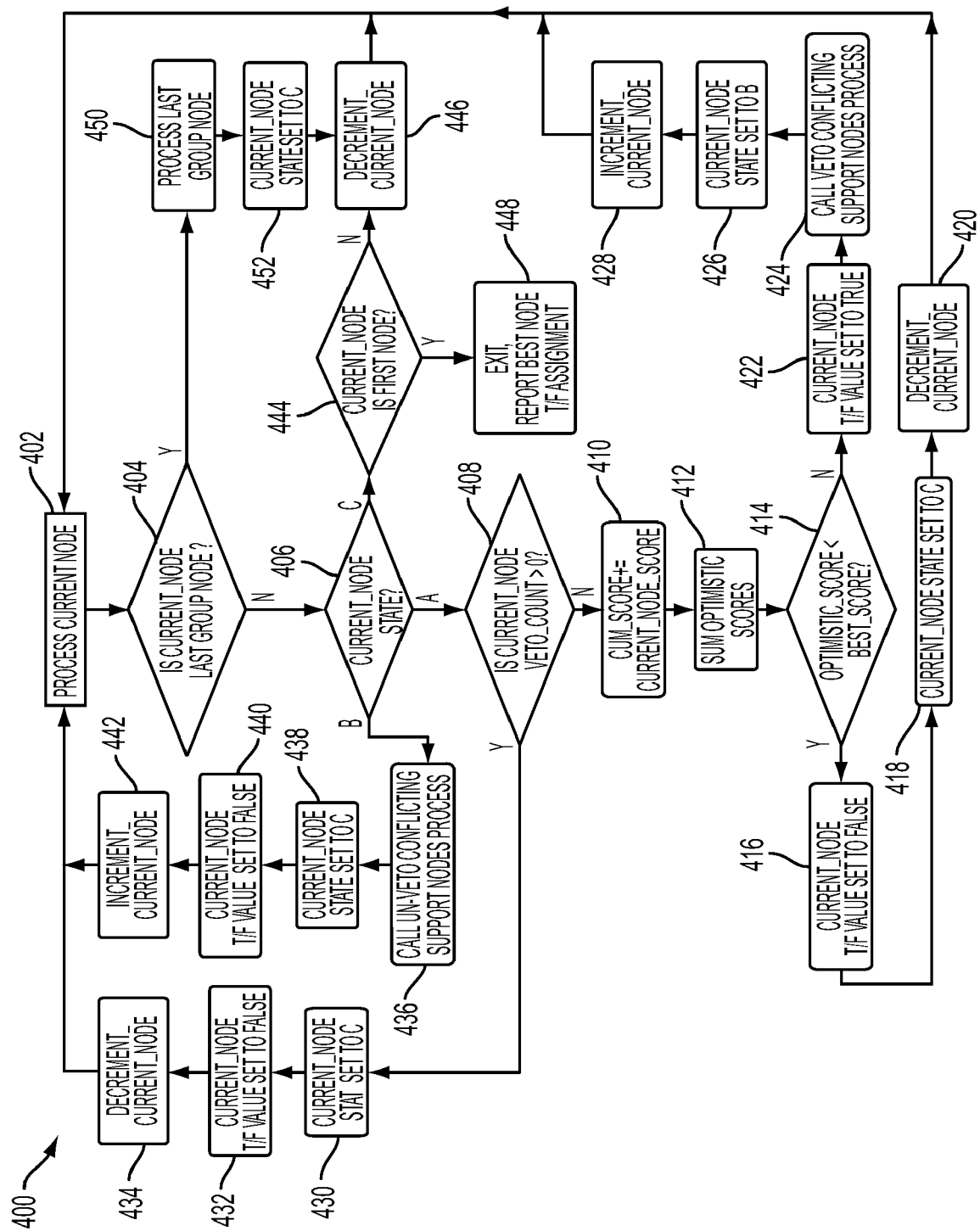
FIG. 25 sets forth a logic diagram of a main loop for a depth-first search optimization using non-overlapping support constraint algorithms.

Turning to FIG. 25, shown is a Logic diagram of the Main Loop of the Depth-First Optimization under the Nonoverlapping Support Constraint Algorithm 400. In step 402, the current node is processed. In this processing, the operation moves to decision diamond 404 to determine whether the node is a current node of the last group node. If it is not, a determination is made at decision diamond 406, whether the current node state is one of A, B, or C (See FIG. 26, where A is unexplored, B is True, C is True and False). If it is A, decision diamond 408 is investigated to see whether the current node has a veto count greater than zero (0). If the answer to this is no, the process moves to block 410 to see whether the cumulative score of the current node is equal to the current node score. Then in step 412, the optimistic scores are summed. The operation "Sum Optimistic Scores" means to add the current cumulative score with the scores of nodes lower in the tree whose veto count is equal to zero (0). Then a determination is made 414 whether the optimistic score is less than the best score. If yes, a variable current node T/F value is set to the value, False 416. Then the variable current node state is set to the value "C" 418 and the value of the variable current node is decremented 420, and the process moves back to the process current node input 402.

If at step 414, it is found that the optimistic score is greater than the best score, the process sets the variable current node T/F value to True 422, and a process is called to veto-conflicting support nodes 424. At this point, the variable current node state is set to the value, "B" 426, and the variable current node is incremented 428. Thereafter, the process moves back to the input process current node block 402.

If, however, at step 408 it is determined the current node veto count is greater than zero (0), the process sets the variable current node state to "C" 430, the variable current node T/F value is set to False 432, and the variable current node is then decremented 434. Thereafter, the process moves to step 402 for the next processing of a current node. This, therefore, is the alternative available when the current node state is found to be "A" at step 406.

On the other hand, if at step 406 the current node state is "B", then a process is called to un-veto conflicting support nodes 436, the variable current node state is set to "C" 438, the variable current node T/F value is set to False 440, and the value of the variable current node is incremented 442.

The preceeding are the steps which occur when the current node state is "B". However, if at step 406, the current node state is "C", then an inquiry is made as to whether the current node is the first node 444. When the answer no, then the value of the variable current node is decremented 446, and the process moves back to the processing of a current node 402. If at step 444 it is determined the current node is the first node, the process is exited and reported the best node T/F assignment is made 448.

Returning to step 404, when it is determined the current node is the last group, the process will then process the last group node 450. The variable current node state is set to "C" 452, and the variable current_node is decremented 446. At this point, the process again returns to the initial processing of a current node 402.

Figure 26:
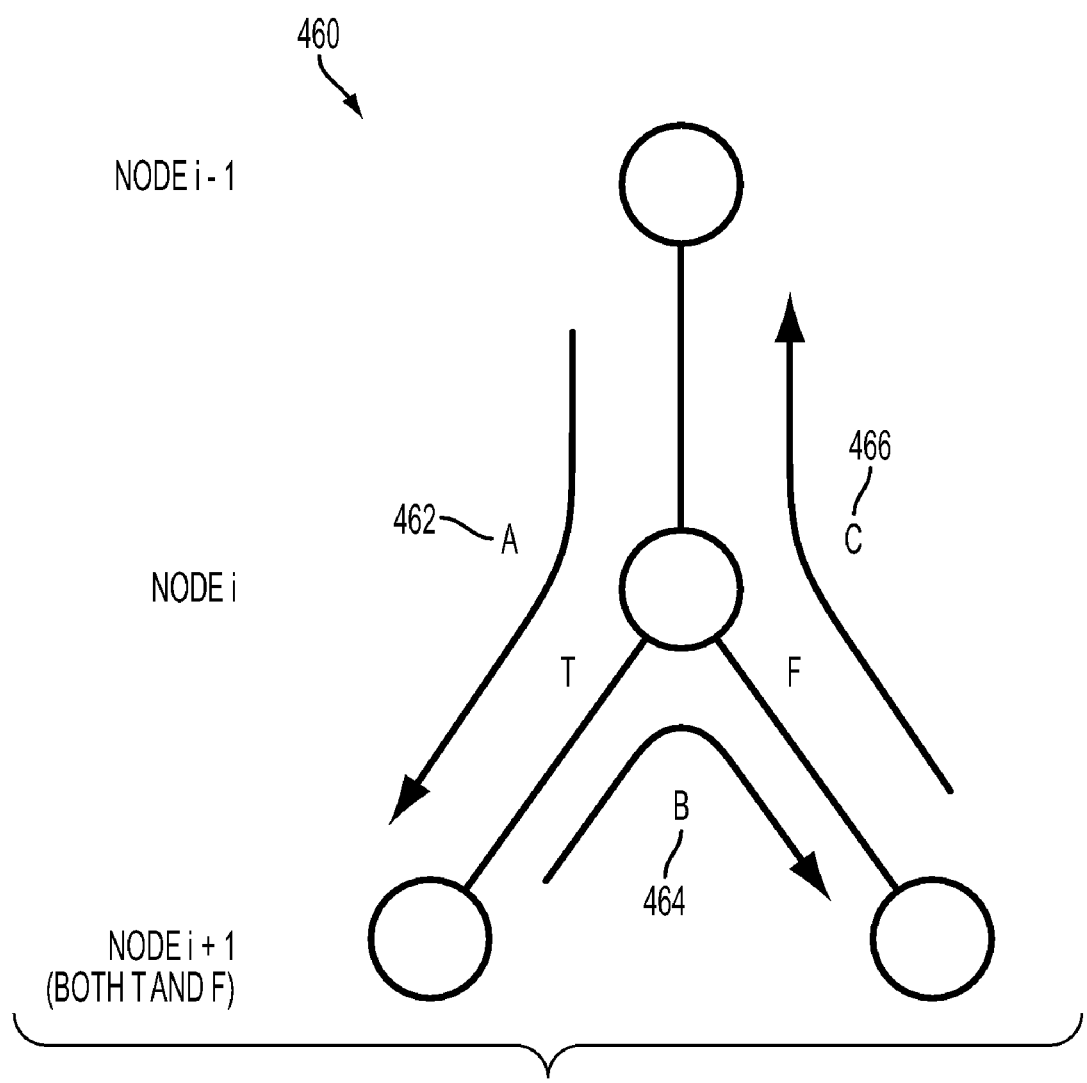
FIG. 26 is an illustration of how states (A, B, C) keep track of node search in a search tree by directing a tree pointer.

As previously mentioned, FIG. 26 is an illustration of a segment of a search tree (or a very simplistic overall search tree), which is generated by operation of the search concepts being described herein. The figure describes how the node states, A, B, and C in the search tree, keep track of current state of the search and direct the tree-pointer to the next node in the search. FIG. 26 shows that the node search state variable 460 which can take the value states, A, B, or C. These keep track of whether a node has not yet been explored (State A) 462, explored as True (State B) 464, or explored as both True and False (State C) 466.

Turning now to step A3 of steps A1-A3, "Exit: output the best node T/F assignment", the algorithm exits when the tree-pointer reaches the top node and its current-state is State C. This occurs when all nodes below it have been explored or pruned. The algorithm then outputs the True/False values of the best scoring True/False assignment found during the course of the search. This corresponds to a selection of a best group hypotheses in the diagram of, for example, FIG. 15.

Figure 27:
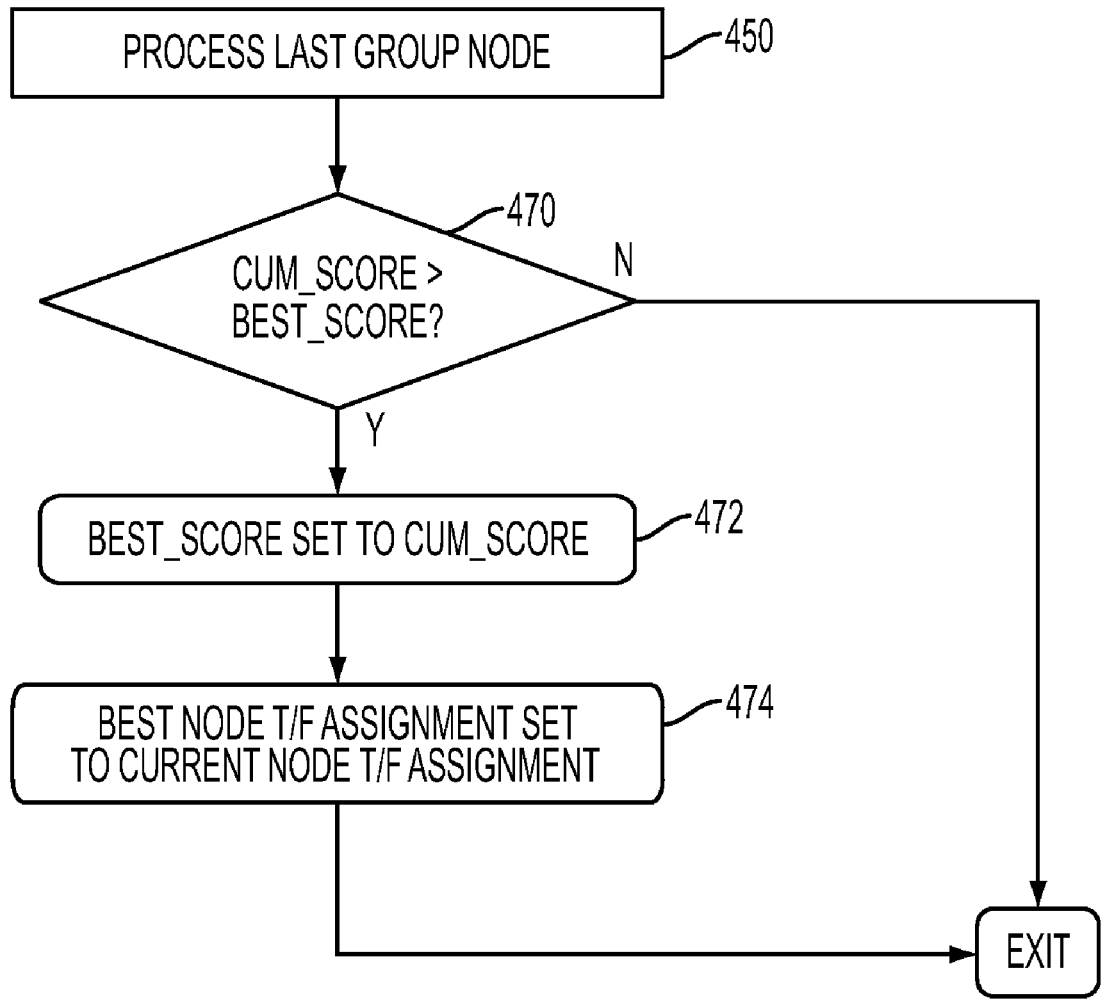
FIG. 27 expands on the steps in a processing for the last group node in a node search.

With particular attention to FIG. 27, the operations related to and following the processing of the last group node 450 is shown in more detail. More particularly, it is determined whether the cumulative score is greater than the best score 470. When this is answered in the positive, the variable best score is set to the value of the variable cumulative score 472. Then the variable best node true-or-false assignment is set to the value current node true-or-false assignment 474. Using this information, the system then exits the process. On the other hand, if at step 470, the cumulative score is not found to be greater than the best score, the process is answered in the negative, and an exit is immediately entered.

Figure 28:
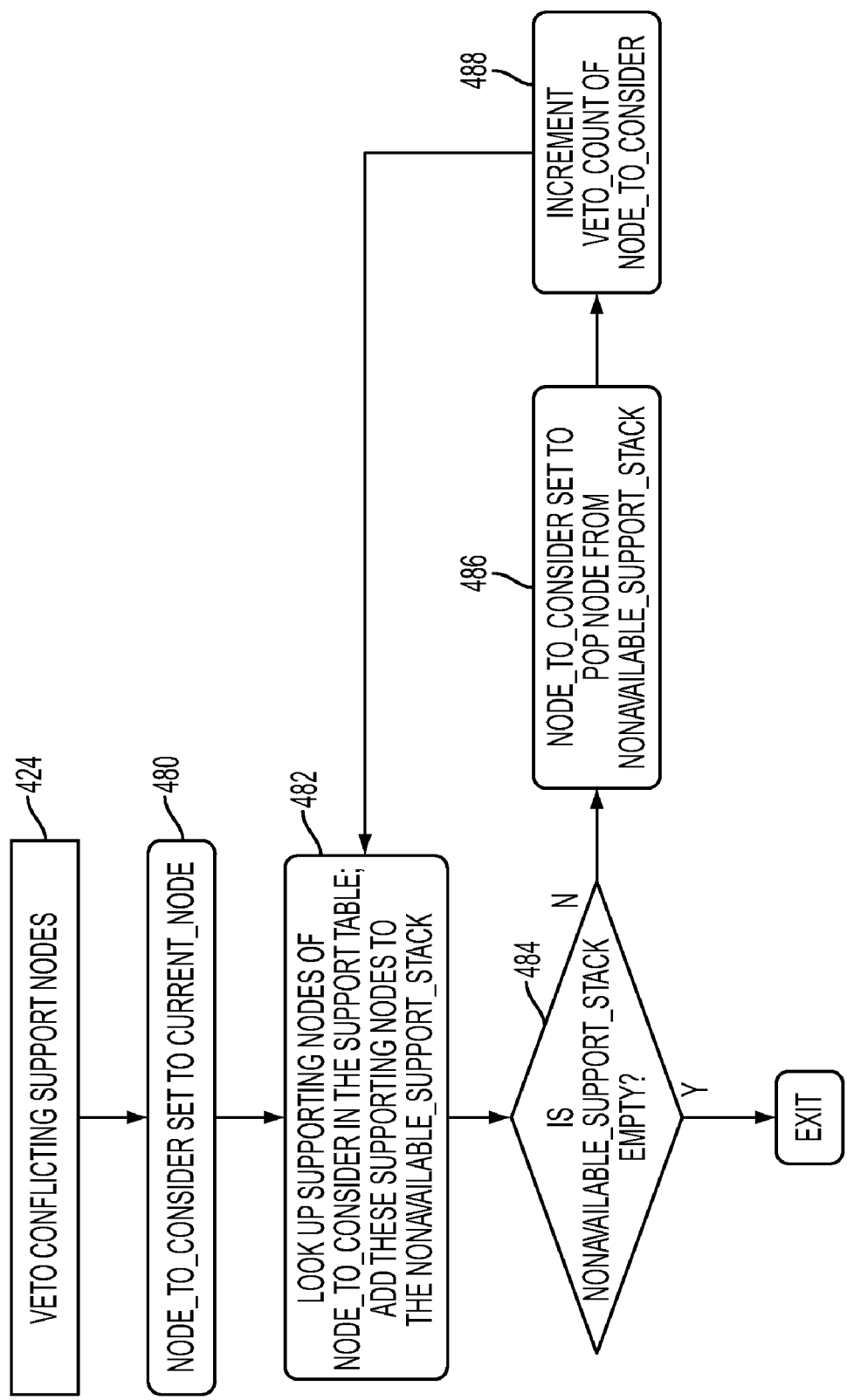
FIG. 28 sets out a more detailed flow diagram for the veto-conflicting-support-node operation in the structured recognition operations.

Turning to FIG. 28, greater detail is shown as to the veto conflicting support node operation 424. Particularly, the variable node to consider is set to the value current node 480. At this point, the system will look up supporting nodes of the node to be considered in the support table. The supporting nodes will be added to a non-available support stack 482, and the system will determine whether the non-available support stack is empty 484. If it is empty, the process is exited. However, if it is not empty, the node to consider is set to value pop node from the non-available support stack 486, and the variable veto count of the node to consider will be incremented 488. At this point, the process will again move to step 482 to determine if any other nodes are at the non-available support stack in step 484, and the process will continue until the non-available support stack is empty. In this process, the system will determine whether the non-overlapping constraint of the system is met.

Figure 29:
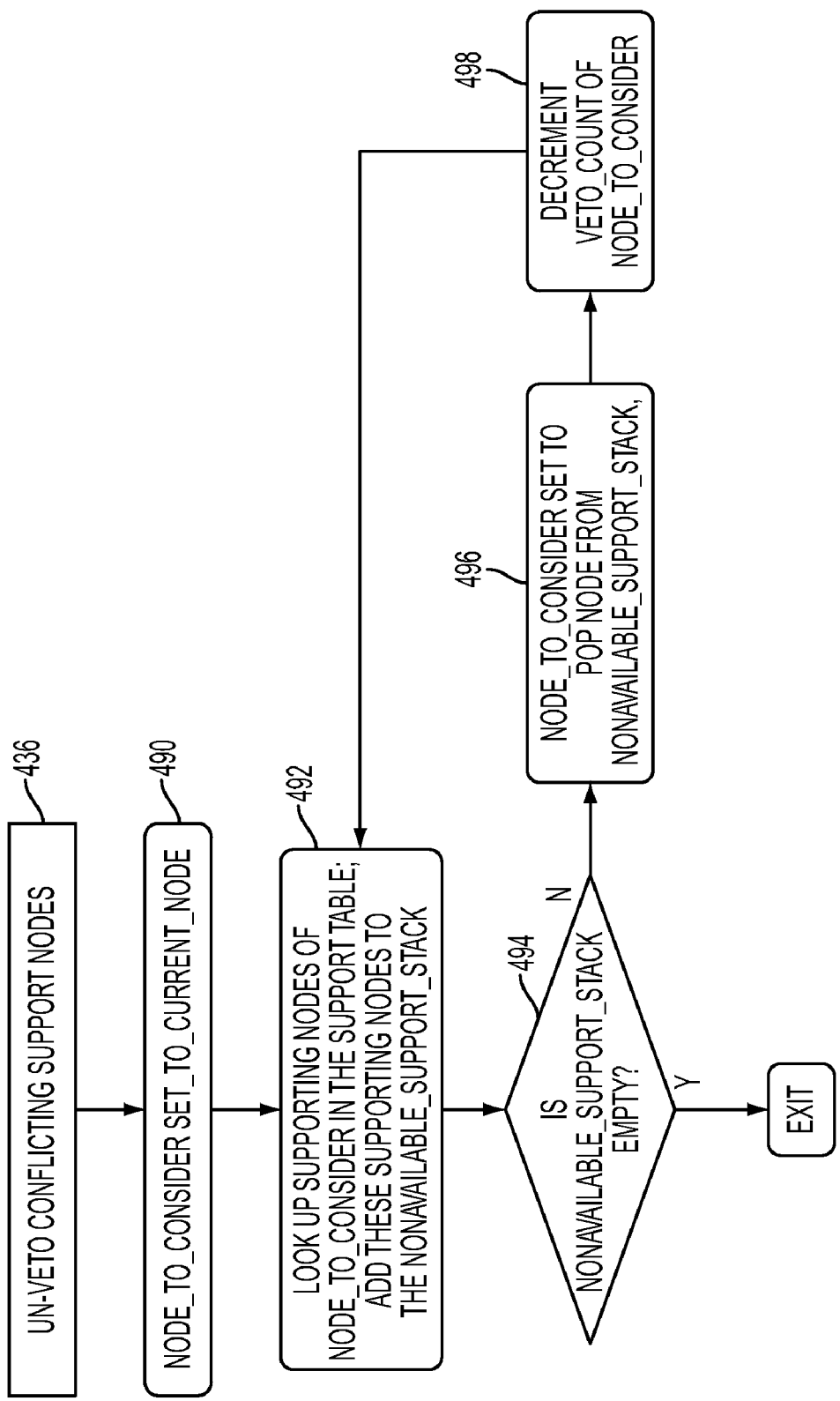
FIG. 29 sets forth an un-veto-conflicting support node operation during the structured recognition operations.

Turning to FIG. 29, the process of un-veto conflicting support nodes 436 of FIG. 25 is shown in more detail. More particularly, the variable node to consider is set to the value current node 490, and again in step 492 the system will look to the supporting nodes of the node to consider in a support table, and add the supporting nodes to the non-available support stack. Then at step 494, the process will determine whether or not the non-available support stack is empty. When, again, answering the affirmative, the process is exited. However, when answering in the negative, the node to consider is set to value pop node from the non-available support stack 496, and the variable veto count of the node to consider will be incremented 498. Thereafter the process continues, until step 494 is answered in the affirmative and the process is exited.

The search concepts described herein, which employ the non-overlapping constraint, have been described with particular attention to structure recognition. However, its uses are not intended to be limited to these implementations, but may also be applied to other diagram recognition uses, as well as other computer vision applications or any other field which would benefit from the search capabilities obtained by the described methods and processes.

The above discussion sets forth operation of the various procedures where the determination of the T/F value is used to prune the search tree in order to arrive at an optimized, nearly-optimized or desired obtainable solution. It is to be appreciated for various reasons it may be desirable to "force" an interpretation. Forcing an interpretation means setting the value of a hypothesis to a True or False value by some intervention (e.g., an active input by a user or pre-determined choice) irrespective of how the optimization search would have determined the T/F values of the hypothesis under a non-intervened operation. Therefore, in situations where an optimization search would otherwise find a True (or False) value, the system can be designed to override this determination, thereby having the nodes within this calculation as potentially acceptable (or unacceptable).

Figure 23:
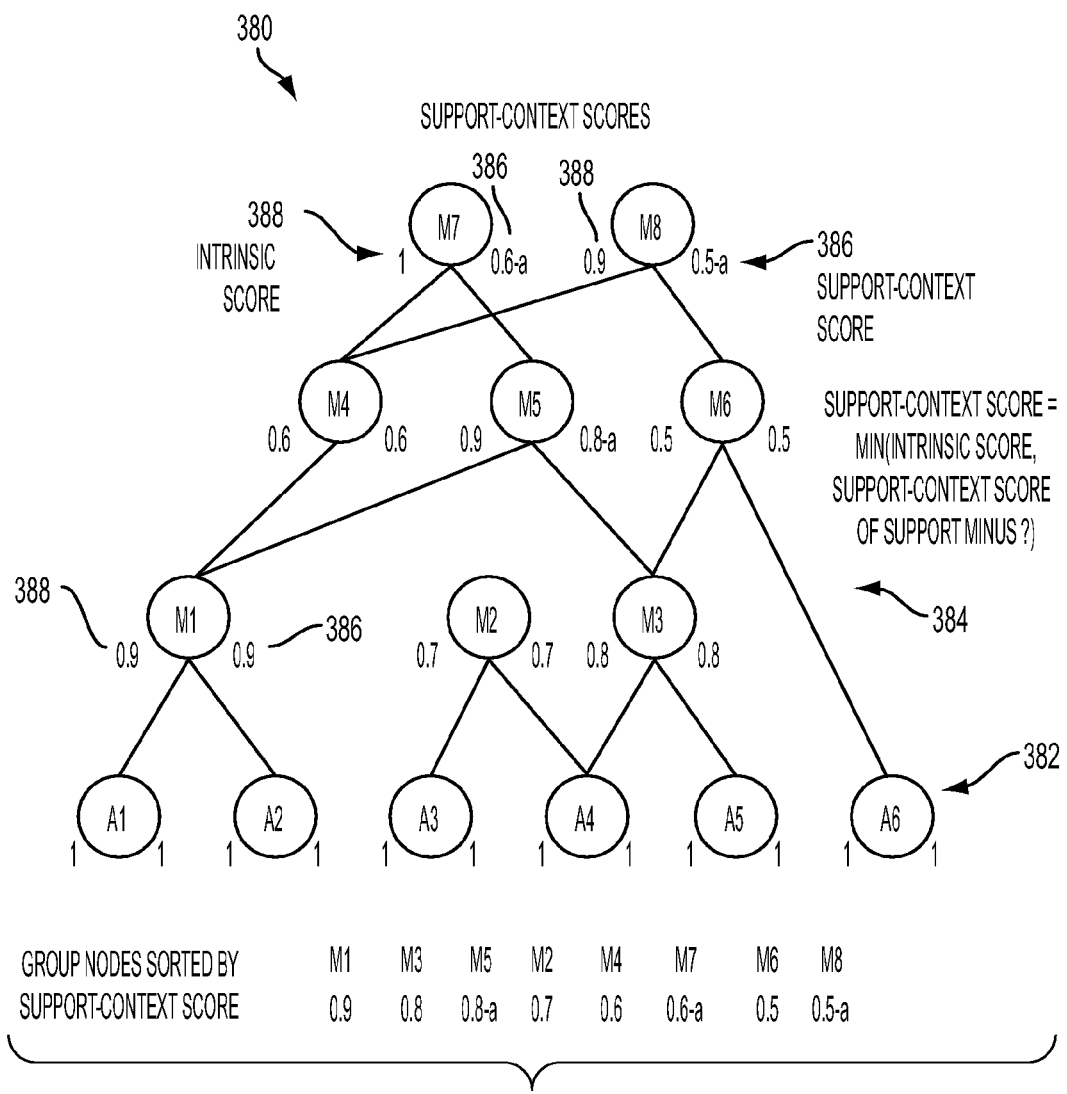
FIG. 23 is a hierarchical node diagram depicting the support context scores and intrinsic scores found during the structure recognition operations.
Figure 24:
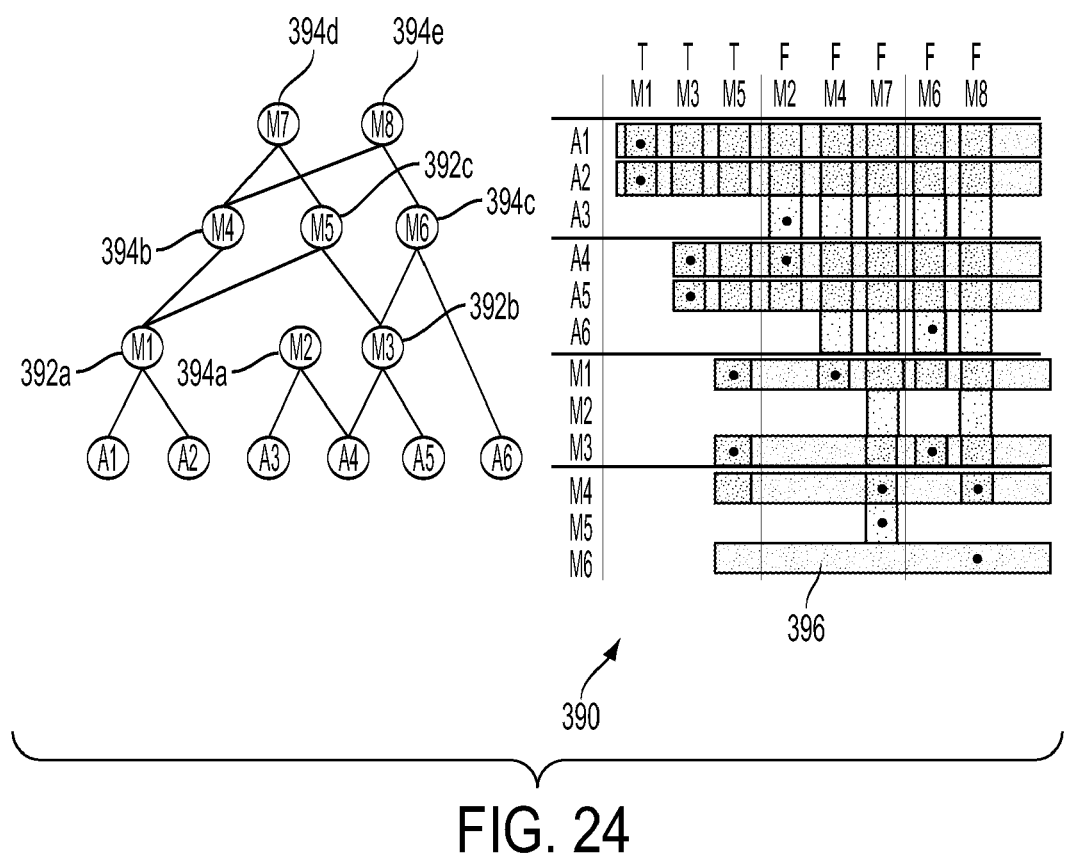
FIG. 24 is an example of a hierarchical node lattice and representation of support relations in a support table obtained during the structure recognition operations.
Figure 30:
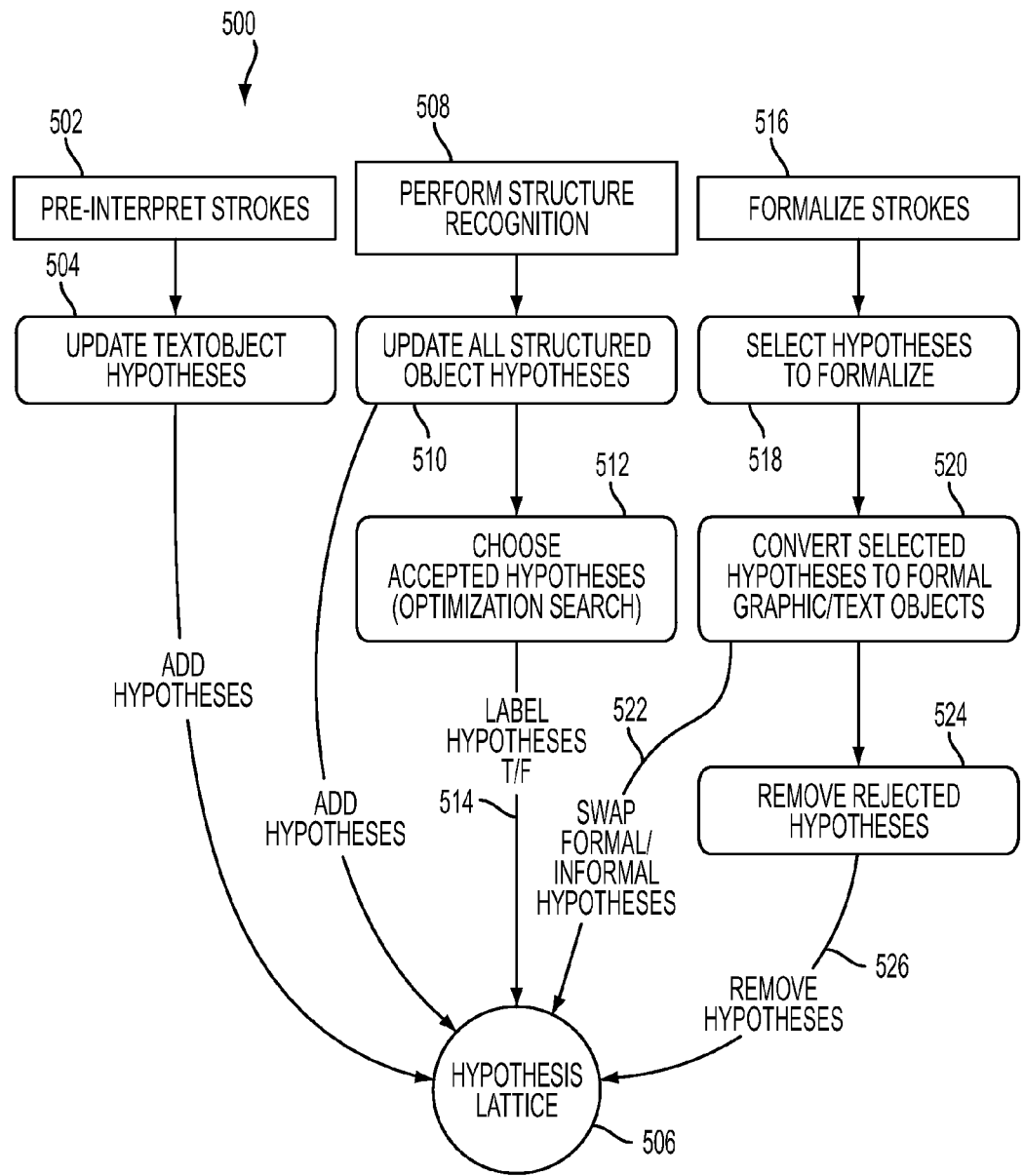
FIG. 30 illustrates operations of the recognition module that modify hypotheses lattices.

It is to be understood the preceding sections describe recognition operations which employ the generation of a hypothesis lattice (e.g., 310 of FIGS. 14 and 380 of FIG. 23). It is also to be appreciated, and as illustrated in FIG. 30, various operations permit the modification of the hypothesis lattice. For example, in system diagram 500, when the pre-interpret stroke operation 502 is performed, updated text object hypotheses 504 are provided to the hypothesis lattice 506. Similarly, when structure recognition operations 508 are undertaken, a particular operation includes updating all structured object hypotheses 510. If this is all that is required under the recognition operation, these update structured object hypotheses are provided to hypothesis lattice 506. On the other hand, the system may require a selection of accepted hypotheses (i.e., the optimization search must be undertaken 512). In this situation, prior to updating the hypothesis lattice, the hypotheses are labeled with true or false values 514.

Under the stroke formalization operations 516, the system performs select operations to determine which hypotheses are to be formalized 518, and the selected hypotheses are converted to formal graphical objects 520. Thereafter, these formal objects are exchanged or swapped with the informal hypotheses 522 in updating of the lattice 506. In an alternative action, the system may require removal of rejected hypotheses 524, then the selected hypotheses are removed 526 for the updating of the hypothesis lattice 506.

It is also noted the preceding discussions set forth operations by which an electronically formed node-link diagram is provided with intelligence which permits the structure of the diagram to be recognized. These operations allow editing of the node-link diagram. Various aspects of an embodiment of the pre sent system and method from obtaining of elemental or atomic objects through the selection of a particular hypothesis are summarized in a step-by-step fashion below. More particularly, depicted are the steps to provide (I) stroke-by-stroke processing operations, and (II) follow-on processing operations as have been described herein:

I. Stroke-By-Stroke Processing Stage

The Stroke-By-Stroke Processing Stage Proceeds as Follows:
1. Formation of Atomic objects (strokes, nodes).
   1a. Remove the next available stroke from the stroke interpretation queue.
   1b. Compute a measure for whether the stroke is cursive writing. This is based on the stroke's sum squared curvature, length, speed, and optionally other properties.
   1c. Strokes that are determined to be cursive writing are considered atomic, of type "text", and are returned to the front of the stroke interpretation queue.
   1d. Strokes that are not determined to be cursive writing are broken at corners according to means known in the art. Each resulting stroke fragment is considered an Atomic stroke. The set of Atomic stroke fragments created is placed at the front of the stroke interpretation queue.
2. Formation of Molecular text object hypotheses based on groupings of Atomic stokes.

Atomic strokes are removed from the stroke interpretation queue and considered with respect to the current set of Text Object type Molecular object hypotheses in the hypothesis lattice. (Initially there will be no Molecular objects in the hypothesis lattice.) For each text type Molecular hypothesis, the stroke's location, length, shape, and other properties are evaluated to determine an action to take:
   if the stroke is fully compatible with the Text Object Molecular object hypothesis, then the stroke is added to the support of that Molecular object.
   if the stroke is partially compatible with the Molecular object hypothesis, then two new Molecular object hypotheses are formed: one consisting of the stroke alone, and another consisting of the stroke plus the supporting Atomic strokes of that Molecular object.
   if the stroke is determined to be partially compatible with no existing text type Molecular object hypothesis, then a new text type Molecular object hypothesis is formed with that stroke as its only support.

II. Follow-on Processing Stage
3. End linking.
   3a. For all strokes (stroke fragments) that have not been determined to be cursive writing, stroke end objects are created representing the locations and orientations of the endpoints of each stroke.
   3b. End link data structures are formed representing pairs of stroke ends that are sufficiently near to one another according to a threshold. The degree to which each such end pair forms a corner and the degree to which each such end pair forms a smooth curvilinear alignment are computed and added to the end link data structure.
   3c. Search is performed for perceptually closed paths formed by Atomic strokes, according to an algorithm known in the field. Each resulting closed path graphic object is added to the hypothesis lattice.
   3d. All strokes not participating in a closed path graphic object are further processed to discover triples of strokes forming a wedge or arrowhead configuration. Pairs of arrowhead strokes are entered as arrowhead graphic objects in the hypothesis lattice.
   3e. All strokes not participating in a closed path graphic object are further processed to discover chains of strokes linked end-to-end. These chains are entered as open path graphic objects on the hypothesis lattice.
4. Creation of Graph or Node-Link Structure nodes.
   4a. Sets of Molecular objects in the hypothesis lattice meeting the requirements of Graph Node and Graph Link objects defined above are found by exhaustive searching over pairs of Molecular objects that are of appropriate type and appropriate spatial proximity to one another. For example closed path objects and text type Molecular objects are compared and a Graph Node object is created if the closed path object is found to enclose the text object.
   Similarly, if an open path object is found to have a "pointing to" relation to text type Molecular object or a closed path object, then a Graph Link and Graph Node object are created.

5. Assignment of confidence scores.
   5a. Each Molecular object in the hypothesis graph is given a confidence score, based on how well its Atomic support fits the ideal model for that Molecular object's type.
   5b. Each Node-Link Structure object in the hypothesis graph is assigned a score depending on the scores of its contributing Node-Link Molecular objects, and on their spatial configuration fulfilling the ideal configuration of parts defined for that Node-Link Structure object type.
6. Reinforcement of Graph Structure confidence scored.
   6a. The confidence scores of Graph Structure objects are adjusted by the degree to which they reinforce one another. Confidence is increased to the degree that Graph Structure Node objects are pointed to by Graph Structure Link objects, to the degree that Graph Structure Link objects point to Graph Structure Node objects.
7. Selection of hypotheses.
   7a. Winning hypotheses are selected from the hypothesis graph by best search. The highest scoring Graph Structure Node is selected to be "accepted" and all Molecular objects that support it are assigned to it.
   7b. For each such supporting Molecular object, all Atomic strokes supporting that Molecular object are assigned to it.
   7c. All Molecular objects and Atomic strokes that were assigned to an object in the next layer have their support removed from all other hypotheses in the hypothesis graph.
   7d. All affected Graph Structure and Molecular objects re-compute their confidence scores.
   7e. Control returns to 7a until no non-accepted Graph Structure hypothesis nodes remain with a confidence score above a threshold value.
   7d. The accepted Graph Structure Nodes and their supporting Molecular objects and Atomic strokes are registered in a data structure recording the logical node-link and support relations among the abstract objects and their supporting strokes. This data structure supports the user selection and editing operations described above.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A selection process designed to select optimized results from a plurality of possible results represented in a search tree, the process comprising:
   employing a tree-search, wherein bounds are used to prune at least one node or branch of the search tree;
   invoking a non-overlapping support constraint in conjunction with the tree search to further prune the search tree, wherein the non-overlapping support constraint which requires that any one node or branch must support at most one other accepted node or branch which has been selected by the tree search process is relaxed to permit support of more than one other accepted node or branch;
   storing an optimized search tree into memory, following the invoking of the non-overlapping support constraint; and
   employing the optimized search tree in additional processing operations.

2. The process according to claim 1, wherein the tree search is a depth-first tree search.

3. The process according to claim 1, wherein the tree search is a best-first tree search.

4. The process according to claim 1, wherein the non-overlapping support constraint includes dynamically vetoing nodes or branches of the search tree based on decisions made higher in the search tree by the tree search process.

5. The process according to claim 4, further including non-vetoing previously vetoed nodes or branches of the search tree.

6. The process according to claim 1, wherein the non-overlapping constraint includes searching a binary tree where one branch corresponds to assigning true values and the other branch corresponds to assigning false values.

7. In a computer controlled system, provided is a method designed to select optimized results from a plurality of possible results represented in a search tree, the method comprising:
   employing a tree-search, wherein bounds are used to prune at least one node or branch of the search tree;
   invoking a non-overlapping support constraint in conjunction with the tree search to further prune the search tree, wherein the non-overlapping support constraint includes dynamically vetoing nodes or branches of the search tree based on decisions made higher in the search tree by the tree search process;
   storing an optimized search tree into a memory of the computer controlled system, following the invoking of the non-overlapping support constraint; and
   employing the optimized search tree in additional computer controlled processing operations.

8. The method according to claim 7, wherein the tree search is a depth-first tree search.

9. The method according to claim 7, wherein the tree search is a best-first tree search.

10. The method according to claim 7, wherein the non-overlapping support constraint requires that anyone node or branch must support at most one other accepted node or branch of the search tree which has been selected by the tree search process.

11. The method of claim 10, wherein the non-overlapping support constraint which requires that anyone branch must support at most one other accepted node or branch which has been selected by the tree search process, is relaxed to permit support of more than one other accepted node or branch.

12. The method according to claim 7, further including non-vetoing previously vetoed nodes or branches of the search tree.

13. The method according to claim 7, wherein the non-overlapping constraint includes searching a binary tree where one branch corresponds to assigning true values and the other branch corresponds to assigning false values.

14. In a computer controlled system, provided is a method designed to select optimized results from a plurality of possible results represented in a search tree, the method comprising:
   employing a tree-search, wherein bounds are used to prune at least one node or branch of the search tree;
   invoking a non-overlapping support constraint in conjunction with the tree search to further prune the search tree, wherein the non-overlapping support constraint which requires that any one node or branch must support at most one other accepted node or branch which has been selected by the tree search process is relaxed to permit support of more than one other accepted node or branch;

storing an optimized search tree into memory, following the invoking of the non-overlapping support constraint; and employing the optimized search tree in additional processing operations.

15. The method according to claim 14, wherein the non-overlapping support constraint includes dynamically vetoing nodes or branches of the search tree based on decisions made higher in the search tree by the tree search process.

16. The method according to claim 15, further including non-vetoing previously vetoed nodes or branches of the search tree.

* * * * *